US009084069B2

(12) United States Patent
Okimoto et al.

(10) Patent No.: US 9,084,069 B2
(45) Date of Patent: Jul. 14, 2015

(54) AUDIO SIGNAL PROCESSING DEVICE, AUDIO SIGNAL PROCESSING METHOD, AND PROGRAM

(75) Inventors: Koyuru Okimoto, Tokyo (JP); Yuji Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 882 days.

(21) Appl. No.: 13/278,644

(22) Filed: Oct. 21, 2011

(65) Prior Publication Data

US 2012/0106763 A1 May 3, 2012

(30) Foreign Application Priority Data

Oct. 29, 2010 (JP) ................................ P2010-244834

(51) Int. Cl.
*G06F 17/00* (2006.01)
*H04S 7/00* (2006.01)

(52) U.S. Cl.
CPC ................ *H04S 7/301* (2013.01); *H04S 7/302* (2013.01); *H04R 2499/13* (2013.01); *H04R 2499/15* (2013.01); *H04S 7/305* (2013.01)

(58) Field of Classification Search
CPC .... H04R 3/04; H04R 2205/024; H04S 7/301; H04S 7/302; H04S 7/305
USPC ............................................................ 700/94
See application file for complete search history.

(56) References Cited

U.S. PATENT DOCUMENTS

| | | | | |
|---|---|---|---|---|
| 6,519,344 | B1 * | 2/2003 | Yajima et al. | 381/103 |
| 6,760,451 | B1 * | 7/2004 | Craven et al. | 381/98 |
| 2001/0038702 | A1 * | 11/2001 | Lavoie et al. | 381/307 |
| 2004/0109570 | A1 * | 6/2004 | Bharitkar et al. | 381/17 |
| 2005/0013443 | A1 * | 1/2005 | Marumoto et al. | 381/56 |
| 2005/0031143 | A1 * | 2/2005 | Devantier et al. | 381/300 |
| 2006/0067535 | A1 * | 3/2006 | Culbert et al. | 381/58 |
| 2007/0127738 | A1 * | 6/2007 | Yamada et al. | 381/98 |
| 2008/0008329 | A1 * | 1/2008 | Pdersen | 381/58 |
| 2008/0192957 | A1 * | 8/2008 | Kubo | 381/103 |
| 2009/0225996 | A1 * | 9/2009 | Brooking | 381/59 |
| 2009/0319066 | A1 * | 12/2009 | Tsuji et al. | 700/94 |
| 2010/0290643 | A1 * | 11/2010 | Mihelich et al. | 381/99 |

FOREIGN PATENT DOCUMENTS

JP 2009-55079 3/2009

* cited by examiner

*Primary Examiner* — Joseph Saunders, Jr.
(74) *Attorney, Agent, or Firm* — Sherr & Jiang, PLLC

(57) ABSTRACT

An audio signal processing device includes two audio signal processing units that serially perform a processing with respect to an input audio signal, and obtain an output audio signal for driving a speaker. One audio signal processing unit of the two audio signal processing units performs, with respect to the input audio signal, a correction process through a filter that realizes a reverse characteristic of an impulse response measured at a first measurement position that is a front position of the speaker. The other audio signal processing unit performs, with respect to the input audio signal, a correction process through a filter that realizes a reverse characteristic of an impulse response measured at a second measurement position different from the first measurement position that is a front position of the speaker.

12 Claims, 19 Drawing Sheets

200

AUDIO SIGNAL PROCESSING DEVICE, AUDIO SIGNAL PROCESSING METHOD, AND PROGRAM

BACKGROUND

The present disclosure relates to an audio signal processing device, an audio signal processing method, and a program, and more particularly, to an audio signal processing device that obtains an audio signal for driving a speaker, or the like.

In regard to an apparatus such as a piece of acoustic equipment that performs an audio signal processing (hereinafter, referred to as an audio signal processing apparatus), there is disclosed a technique that performs a correction process such as a digital filtering process with respect to an audio signal acquired from an audio source. The audio signal processing apparatus outputs an audio signal subjected to the correction process from a speaker or the like, such that it is possible to improve an acoustic quality, acoustic effect, or the like of audio that is output from the speaker or the like.

As one such correction process, correction of a speaker characteristic may be exemplified. The speaker characteristic represents a frequency characteristic of a speaker, which is different depending on an aperture of the speaker, an internal structure, or the like. Here, the frequency characteristic of a speaker includes a phase characteristic that is a temporal variation between the audio signal input to the speaker and the audio signal output from the speaker, an amplitude characteristic that is a strength ratio, or the like.

As an audio signal processing apparatus that can correct the speaker characteristic by performing the correction process with respect to the audio signal, for example, a signal processing device disclosed in Japanese Unexamined Patent Application Publication 2009-55079 may be exemplified. This signal processing device is for promoting an improvement in a low band component of a small-sized speaker by combining an amplification of a low frequency band signal of an input audio signal, and a shift to a high frequency band.

SUMMARY

In regard to a speaker system, a technique, which realizes high acoustic quality through an inverse filtering process, is disclosed. However, there is a problem in that in an audio reproducing system in which a speaker is not installed in a front direction, a listening position characteristic is not optimized, and thereby sufficient high acoustic quality is not obtained.

In recent years, the mounting location of the speaker has varied according to thickness reduction and miniaturization of a product. Particularly, in a design where a design is considered to be important, an invisible speaker design where a speaker is made to be invisible from the outside has become mainstream, and the number of a speaker product, which faces a front side of a product similar to a product until now, has been reduced.

In regard to such a product, even when a speaker high acoustic quality process is performed through an inverse filtering process in the related art, characteristics at a position where a user actually uses a product, and a listening position are not optimized, and therefore an expected effect is not obtained.

It is desirable to provide an audio signal processing device or the like that can provide high acoustic quality with respect to an audio reproducing system in which a speaker is not disposed in a front direction.

According to an embodiment of the present disclosure, there is provided an audio signal processing device including two audio signal processing units that serially perform a processing with respect to an input audio signal, and obtain an output audio signal for driving a speaker, wherein one audio signal processing unit of the two audio signal processing units performs, with respect to the input audio signal, a correction process through a filter that realizes a reverse characteristic of an impulse response measured at a first measurement position that is a front position of the speaker, and the other audio signal processing unit performs, with respect to the input audio signal, a correction process through a filter that realizes a reverse characteristic of an impulse response measured at a second measurement position different from the first measurement position that is a front position of the speaker.

According to this embodiment, by two audio signal processing units, a serial processing is performed with respect to an input audio signal, and an output audio signal for driving a speaker is obtained. One audio signal processing unit of the two audio signal processing units performs, with respect to the input audio signal, a correction process through a filter that realizes a reverse characteristic of an impulse response measured at a first measurement position that is a front position of the speaker. In addition, the other audio signal processing unit performs, with respect to the input audio signal, a correction process through a filter that realizes a reverse characteristic of an impulse response measured at a second measurement position different from the first measurement position that is a front position of the speaker.

As described above, according to the embodiment of the present disclosure, through the correction process in one audio signal processing unit, it is possible to correct disturbance at an inherent sound pressure-frequency characteristic or a phase characteristic which a speaker has. In addition, through the correction process of the other audio signal processing unit, it is possible to correct disturbance in a sound pressure-frequency characteristic or a phase characteristic, which are caused due to a fact that a listening position becomes different from a front position of the speaker. Therefore, it is possible to realize high acoustic quality with respect to a system in which the speaker is not disposed in a front direction.

In addition, the audio processing device may further include, for example, a filter coefficient group retaining unit that retains a plurality of filter coefficient groups as a filter coefficient group of the filter of the other audio signal processing unit; a filter coefficient group selecting unit that selects an arbitrary filter coefficient group among the plurality of filter coefficient groups retained in the filter coefficient group retaining unit; and a filter coefficient setting unit that sets the filter coefficient group selected in the filter coefficient group selecting unit to the filter of the other audio signal processing unit.

For example, the plurality of filter coefficient groups retained in the filter coefficient group retaining unit may be a plurality of filter coefficient groups corresponding to an installation state of the speaker. The installation state of the speaker may include, for example, a state where an audio reproducing system (a photo frame or the like) including the speaker is hung on a wall, a state where the audio reproducing system is on a living room table (close to a wall), a state where the audio reproducing system is on a living room table (center), a state where the audio reproducing system is at a side of a bed, a state where the audio reproducing system is in an entrance hall, or the like.

In addition, the plurality of filter coefficient groups retained in the filter coefficient group retaining unit may be a plurality of filter coefficient groups corresponding to a listening position. For example, in an in-vehicle audio reproducing system including a speaker, the listening position may be a driver's seat, a front passenger seat, a back seat, or the like.

Disturbance in the sound pressure-frequency characteristic or the phase characteristic at the listening position varies depending on the installation state of the speaker or the listening position itself. When a plurality of filter coefficient groups corresponding to the installation state of the speaker, or the listening position is retained and is selectively set to the filter of the other audio signal processing unit, it is possible to realize high acoustic quality regardless of the installation state or the listening position of the speaker.

In addition, the speaker may be disposed integrally with a display panel that performs a video display, and the audio signal processing device may further include: a filter coefficient group retaining unit that retains a plurality of filter coefficient groups corresponding to an installation angle of the display panel as the filter coefficient group of the other audio signal processing unit; an installation angle detecting unit that detects the installation angle of the display panel; and a filter coefficient setting unit that fetches the filter coefficient group corresponding to the installation angle of the display panel from the plurality of filter coefficient groups that is retained in the filter coefficient group retaining unit, based on a detection output of the installation angle detecting unit, and sets it to the filter of the other audio signal processing unit.

For example, in the case of a display panel making up a digital photo frame, or the like, there may be two installation angles in a case where the display panel is disposed with a horizontal displacement and in a case where the display panel is disposed with a vertical displacement. In addition, for example, in the case of a display panel making up a video camera, as the installation angle thereof, there may be a plurality of installation angles corresponding to an aperture angle of the display panel with respect to the video camera main body.

Due to the installation angle of the display panel, disturbance in the sound pressure-frequency characteristic or the phase characteristic at a listening position varies. When a plurality of filter coefficient groups corresponding to an installation angle of the display panel is retained and a filter coefficient group corresponding to an installation angle of a display panel is automatically set to the filter of the other audio signal processing unit, it is possible to realize high acoustic quality regardless of the installation angle of the display panel or the like.

In addition, the audio signal processing device may further include: for example, an impulse response measuring unit that measures the impulse response at the second measurement position; a filter coefficient group calculating unit that calculates the filter coefficient group of the filter that realizes a reverse characteristic of the impulse response measured in the impulse response measuring unit; and a filter coefficient setting unit that sets the filter coefficient group calculated in the filter coefficient group calculating unit to the filter of the other audio signal processing unit.

In this case, the filter coefficient group of the filter, which realizes the reverse characteristic of the impulse response measured at the second measurement position, may be calculated, and this filter coefficient group may be set to the filter of the other audio signal processing unit. Therefore, when the second measurement position is set as a listening position (listening point), it is possible to reliably correct disturbance in the sound pressure-frequency characteristic or the phase characteristic in regard to the listening position. That is, it is possible to realize high acoustic quality regardless of a real use environment of a user.

According to the embodiment of the present disclosure, it is possible to realize high acoustic quality with respect to an audio reproducing system in which a speaker is not disposed in a front direction, such that it is possible to realize a natural reproduction sound and a clear localization of sound by a faithful reproduction of the original sound.

DETAILED DESCRIPTION OF EMBODIMENTS

Hereinafter, embodiments of the present disclosure (hereinafter, referred to as "embodiments") will be described. In addition, the description will be made in the following order.

Figure 1:
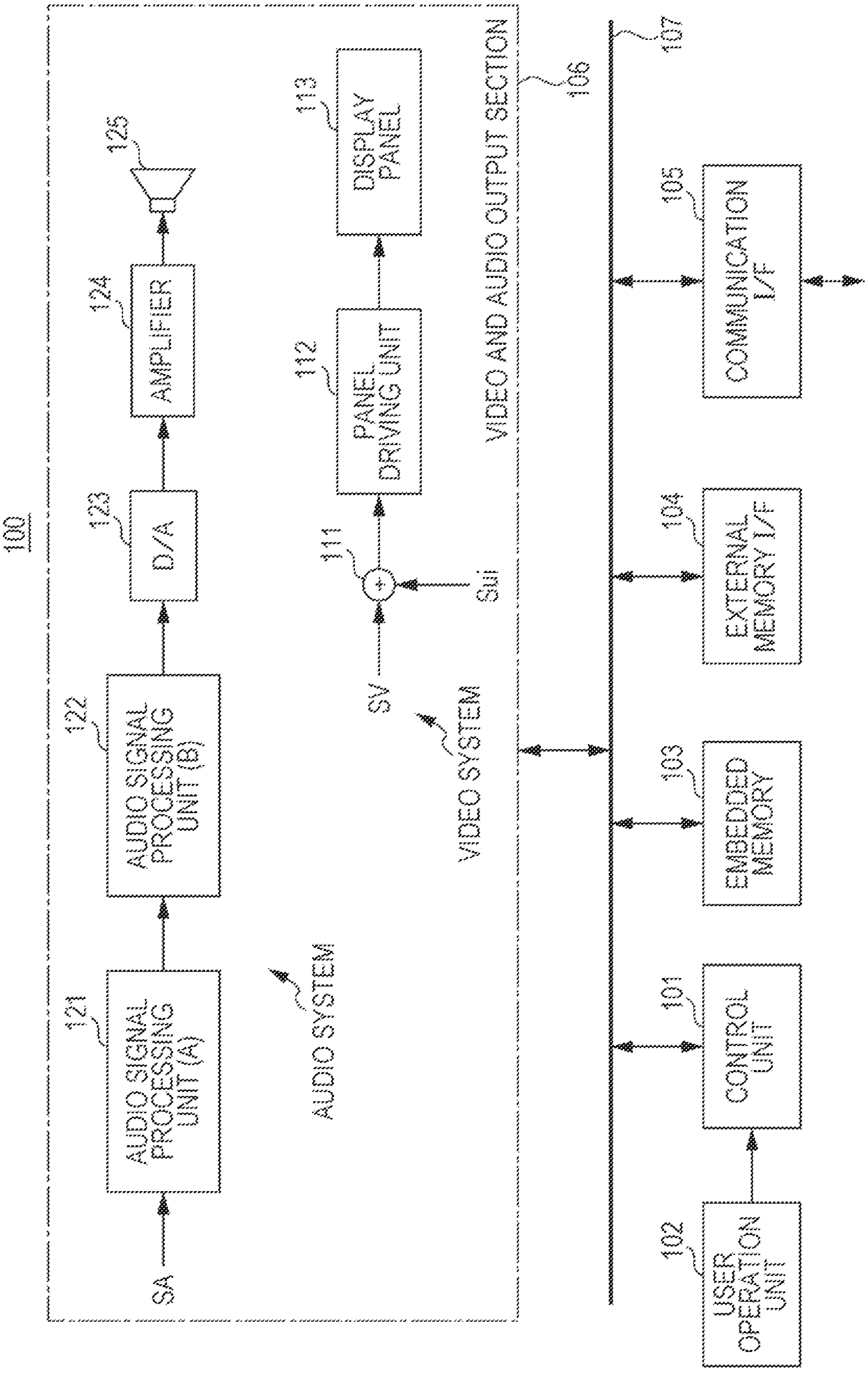
FIG. 1 is a block diagram illustrating a configuration example of a digital photo frame according to a first embodiment of the present disclosure.

1. First Embodiment
2. Second Embodiment
3. Third Embodiment
4. Fourth Embodiment
5. Modification 1. First Embodiment Configuration Example of Digital Photo Frame FIG. 1 illustrates a configuration example of a digital photo frame 100 according to a first embodiment. The digital photo frame 100 includes a control unit 101, a user operation unit 102, an embedded memory 103, an external memory interface 104, a communication interface 105, and a video and audio output section 106, and the respective units are connected to each other through an internal bus 107.

The control unit 101 controls each unit of the digital photo frame 100. The control unit 101 includes a CPU, a ROM, a RAM, or the like. The ROM stores a CPU control program, or the like. The RAM is used for temporary storage of data necessary for a control process of the CPU. The CPU develops the program or data read-out from the ROM on the RAM and activates the program, and controls each unit of the digital photo frame 100.

The user operation unit 102 makes up a user interface, and is connected to the control unit 101. The user operation unit 102 includes, for example, keys, buttons, a dial, or the like, which is disposed in a housing plane (not shown) of the digital photo frame 100. A user may perform a power on and off operation of the digital photo frame 100, a reproduction start-up and stopping operating, or the like by using the user operation unit 102.

The embedded memory 103 is a memory that includes, for example, a flash memory and retains a video signal (video file), an audio signal (music signal), or the like. The video signal and the audio signal are acquired from, for example, a memory card or the like through copying, or acquired over a network. The external memory interface 104 includes a memory card slot, a USB memory port, or the like. The communication interface 105 performs communication with an external apparatus over a network such as the Internet.

The video and audio output section 106 will be described. First, a video system will be described. The video and audio output section 106 includes an overlapping unit 111, a panel driving unit 112, and a display panel 113 as a video system. The panel driving unit 112 generates a panel driving signal that is necessary for displaying a video on the display panel 113 from a video signal SV supplied through the overlapping unit 111. The panel driving signal generated in the panel driving unit 112 is transmitted to the display panel 113, the display panel 113 is operated according to a panel driving signal, and thereby a video is displayed on the display panel 113.

The display panel 113 displays a video based on the panel driving signal transmitted from the panel driving unit 112. The display panel 113 is configured by, for example, an LCD (Liquid Crystal Display), but an organic EL (electro-luminescence) panel or the like may be used.

The overlapping unit 111 overlaps a display signal Sui for a GUI (Graphical User Interface) screen generated under a control of the control unit 101 on a video signal SV, and supplies the resultant overlapped signal to the panel driving unit 112. In this manner, the display signal Sui is overlapped on the video signal SV, such that a user interface screen such as a menu display is displayed on the display panel 113 while being overlapped on a video.

Figure 2:
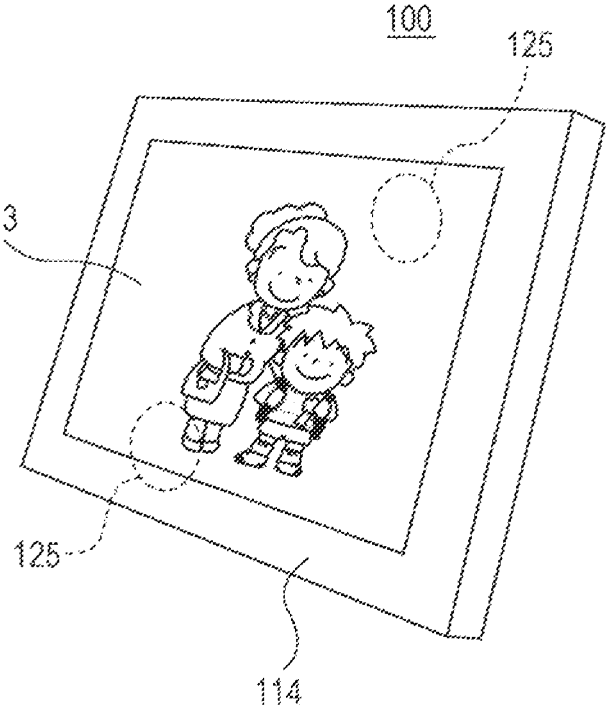
FIG. 2 is a diagram illustrating an exterior appearance of the digital photo frame.

FIG. 2 illustrates an exterior appearance of the digital photo frame 100. This digital photo frame 100 has an overall rectangular shape, and is configured in such a manner that the display panel 113 is inserted in a rectangular-shaped frame 114. A speaker 125 is provided in a rear surface as designated by a broken line. In addition, as the speaker 125, two speakers for left-side audio and right-side audio are provided for stereo reproduction.

Returning to FIG. 1, next, an audio system will be described. In addition, actually, two audio systems for left-side audio and right-side audio are provided, but the two audio systems are the same as each other, such that, here, only one audio system will be described. The video and audio output section 106 includes an audio signal processing unit (audio signal processing unit (A)) 121, an audio signal processing unit (audio signal processing unit (B)) 122, a D/A converter 123, an amplifier 124, and a speaker 125, as the audio system.

The audio signal processing unit 121 makes up one side audio signal processing unit, and the audio signal processing unit 122 makes up the other side audio signal processing unit. In this embodiment, the audio signal processing unit 121 is located at a front stage, and the audio signal processing unit 122 is located at a subsequent stage, but this order may be reversed. The audio signal processing units 121 and 122 serially perform a processing with respect to the audio signal (music signal) SA as an input audio signal, and obtain an output audio signal for driving the speaker 125.

The audio signal processing unit 121 performs a correction process with respect to the audio signal SA, by a filter that realizes a reverse characteristic of an impulse response that is measured at a front position of the speaker 125. In addition, the audio signal processing unit 122 performs the correction process with respect to the audio signal SA by a filter that realizes a reverse characteristic of impulse response that is measured at a position different from the front position of the speaker 125. Here, the position different from the front position of the speaker 125 includes a listening position of the digital photo frame 100.

Figure 3:
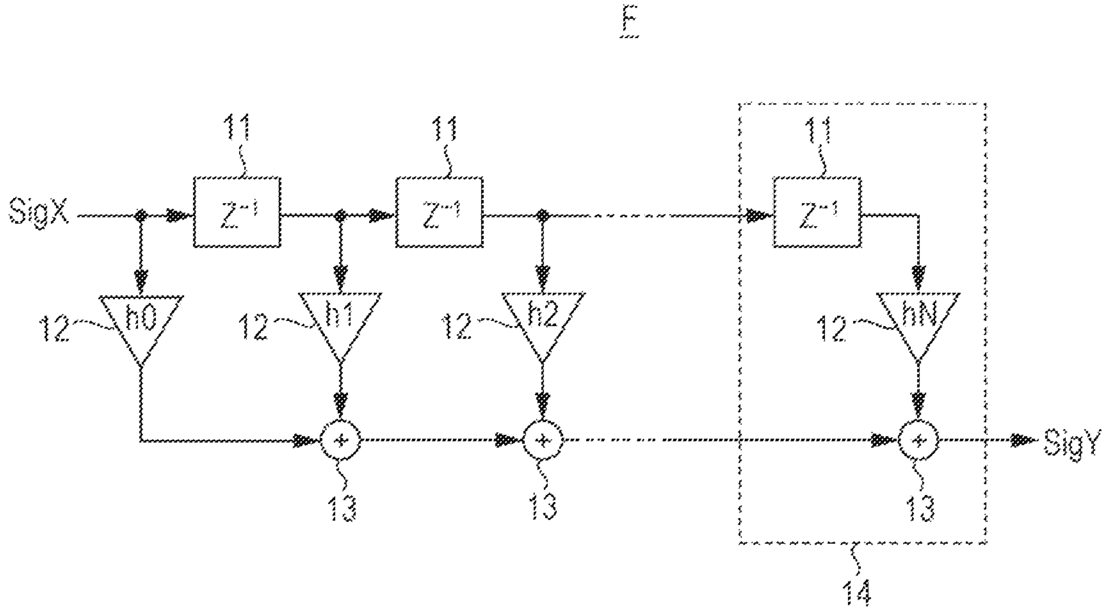
FIG. 3 is a diagram illustrating a configuration example of a digital filter that is used as an audio signal processing unit.

The audio signal processing units 121 and 122 include a digital filter, for example, an FIR (Finite Impulse Response) filter, an IR (Infinite impulse response) filter, or the like. FIG. 3 illustrates an example of the digital filter F used as the audio signal processing units 121 and 122.

The digital filter F includes a plurality of delay blocks 11, a plurality of multipliers 12, and a plurality of adders 13, respectively. A signal SigX input to the digital filter F is subject to a Z transformation (Laplace transformation with respect to a discrete signal) in each delay block 11, and is delayed by one clock. The delayed signal is multiplied by a predetermined filter coefficient group h (a set of filter coefficients h0 to hN) in each multiplier 12. Each signal passed through each multiplier 12 is added to each other by each adder 13 and is output as an output signal SigY. The details of the filter coefficient group h of the digital filter F making up the audio signal processing units 121 and 122 will be described later.

The D/A converter 123 converts the audio signal obtained in the audio signal processing unit 122 from a digital signal to an analog signal. In addition, the amplifier 124 amplifies the analog audio signal obtained in the D/A converter 123, and supplies the amplified signal to the speaker 125. The speaker 125 outputs audio corresponding to the audio signal supplied from the amplifier 124.

Determination of Filter Coefficient Group of Audio Signal Processing Unit

As described above, the audio signal processing unit 121 performs the correction process by the filter that realizes the reverse characteristic of the impulse response that is measured at the front position of the speaker 125. That is, the filter coefficient group h of the digital filter F making up the audio signal processing unit 121 is determined as described below.

Figure 4:
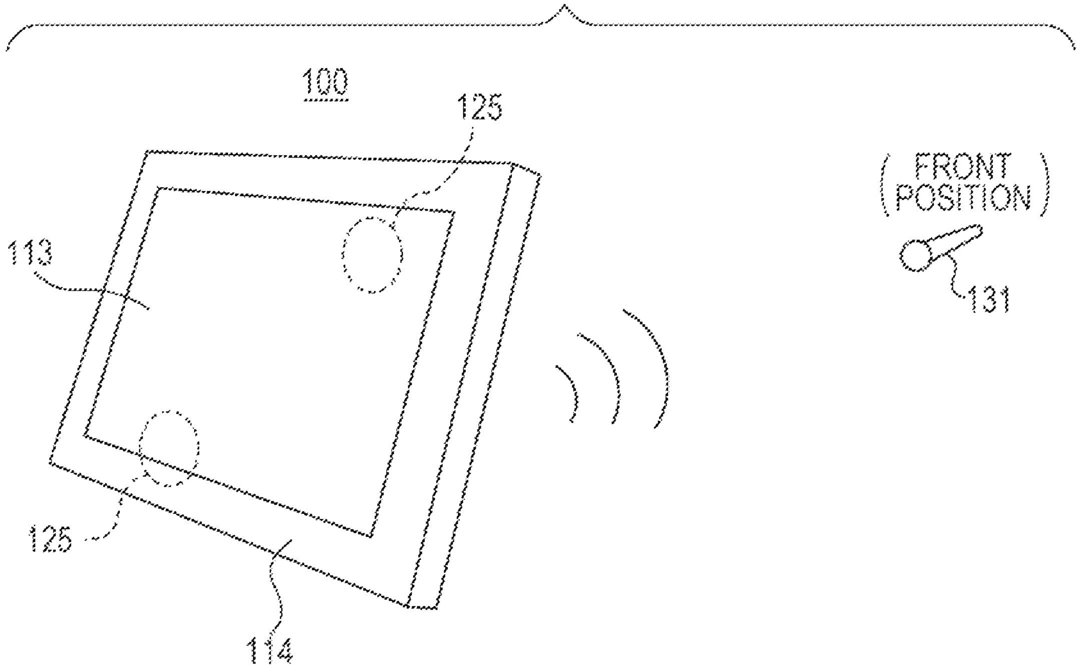
FIG. 4 is a diagram illustrating an impulse response measurement when a filter coefficient group is obtained in the audio signal processing unit to correct a speaker characteristic of a speaker.
Figure 5:
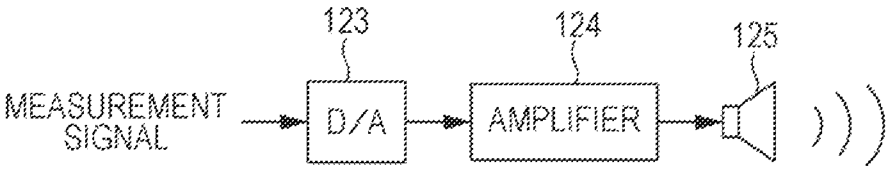
FIG. 5 is a diagram illustrating a configuration of an audio system when the filter coefficient group is obtained in the audio signal processing unit to correct the speaker characteristic of the speaker.

The determination of the filter coefficient group h is performed based on a measurement result of the impulse response measured at the front position of the speaker 125. As shown in FIG. 4, the measurement of the impulse response is performed by using the speaker 125 and a microphone 131 that is opposite to the speaker 125 at a predetermined distance. A measurement signal such as a TSP (Time Stretched Pulse) signal is supplied to the speaker 125, and a sound emission from the speaker 125 is performed. This audio is measured by the microphone 131, and thereby an impulse response is obtained. FIG. 5 illustrates a configuration of the audio system in this case. In this case, the measurement signal is converted from a digital signal to an analog signal in the D/A converter 123, and is amplified in the amplifier 124, and then is supplied to the speaker 125.

Figure 6A:
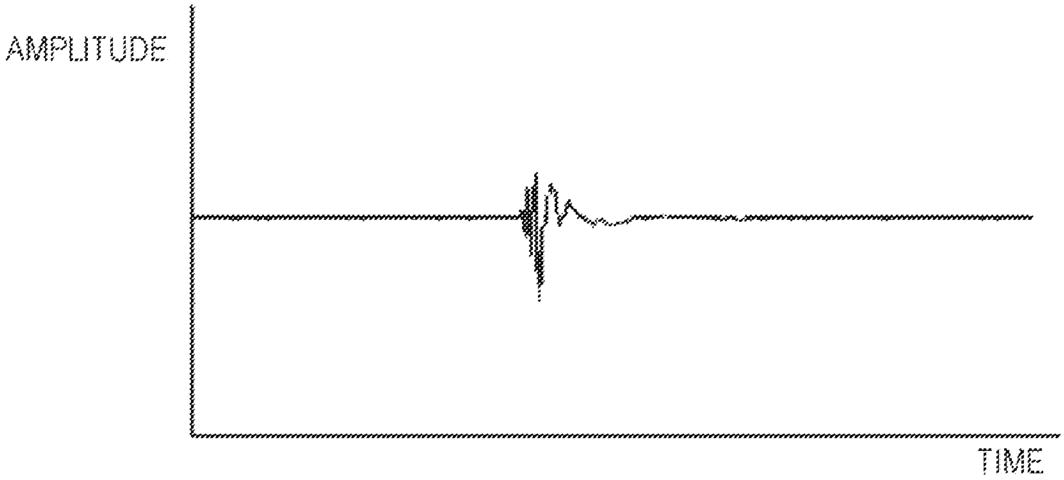
FIGS. 6A and 6B are diagrams illustrating an example of an impulse response measured at a front position of the speaker and an amplitude-frequency characteristic corresponding thereto.
Figure 6B:
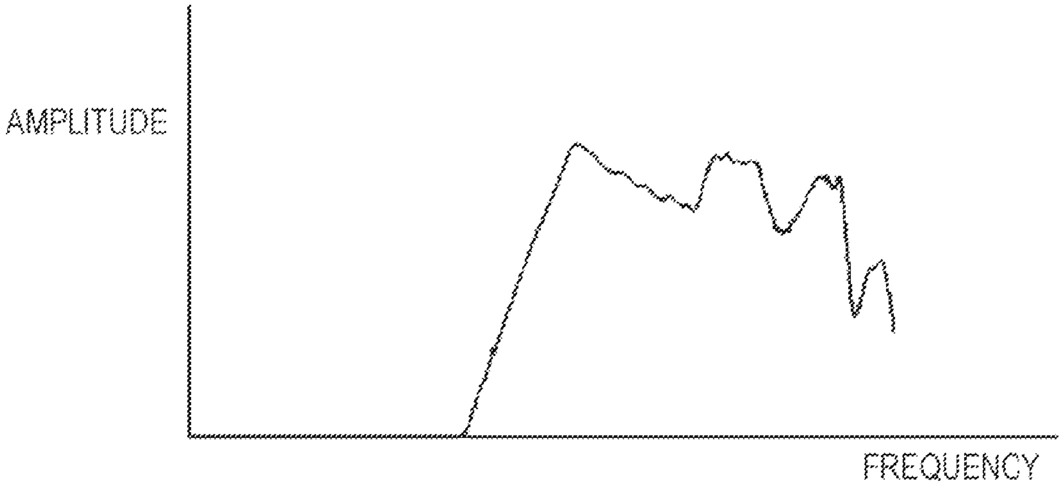

FIG. 6A illustrates an example of the impulse response measured by the microphone 131. In FIG. 6A, the horizontal axis represents a time, and the vertical axis represents amplitude. The impulse response shown in FIG. 6A is subject to a Fourier transformation (time domain signal is transformed to a frequency domain signal), such that an amplitude-frequency characteristic as shown in FIG. 6B may be obtained. In FIG. 6B, the horizontal axis represents frequency and the vertical axis represents amplitude. The characteristic of the speaker 125 shown in FIGS. 6A and 6B is a speaker characteristic.

The filter coefficient group h of the digital filter F making up the audio signal processing unit 121 is determined in such a manner that the speaker characteristic of the speaker 125 shown in FIGS. 6A and 6B is corrected into an ideal speaker characteristic. The ideal speaker characteristic represents an impulse response that is to be collected by a microphone under the assumption that an ideal speaker and microphone are opposite to each other with the same distance as when the impulse response of the speaker 125 was measured, and a frequency characteristic thereof. Here, as the ideal speaker characteristic, an example where an impulse peak is sharp and the frequency characteristic is flat is exemplified, but this is not limited thereto and may be arbitrarily set.

Figure 7A:
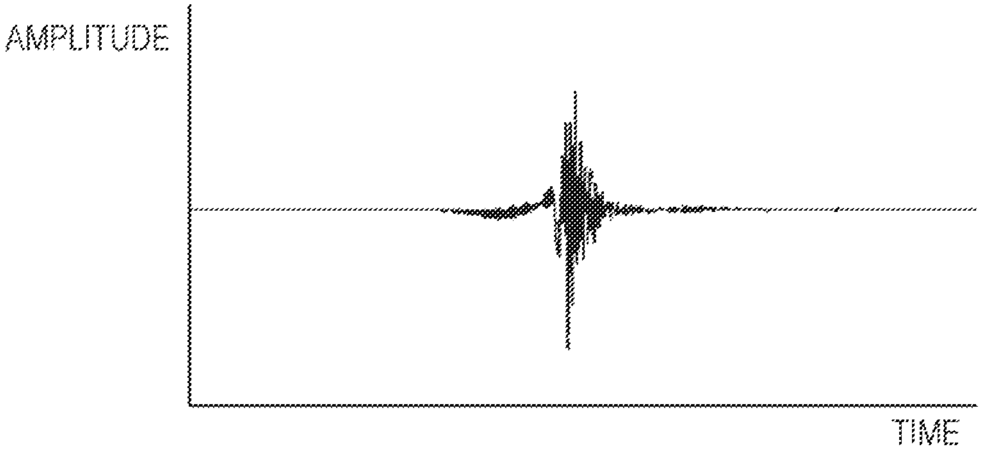
FIGS. 7A and 7B are diagrams illustrating an example of a reverse characteristic impulse response of the impulse response measured at the front position of the speaker, and an amplitude-frequency characteristic corresponding thereto.
Figure 7B:
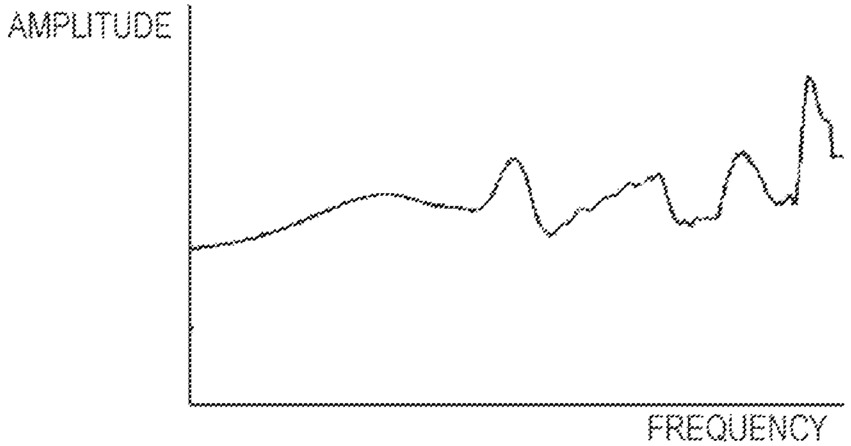

The filter coefficient group h (h0 to hN) of the digital filter F making up the audio signal processing unit 121 is regarded to realize a “reverse characteristic” that is calculated by excluding “1” in the speaker characteristic of the speaker 125. FIG. 7A illustrates an impulse response of the reverse characteristic and FIG. 7B illustrates a frequency characteristic of the reverse characteristic. This impulse response of the reverse characteristic may be set as the filter coefficients h0 to hN of the digital filter F. In addition, the number of the filter coefficients h0 to hN (the number of taps) is the number of peaks of the impulse response.

Figure 8A:
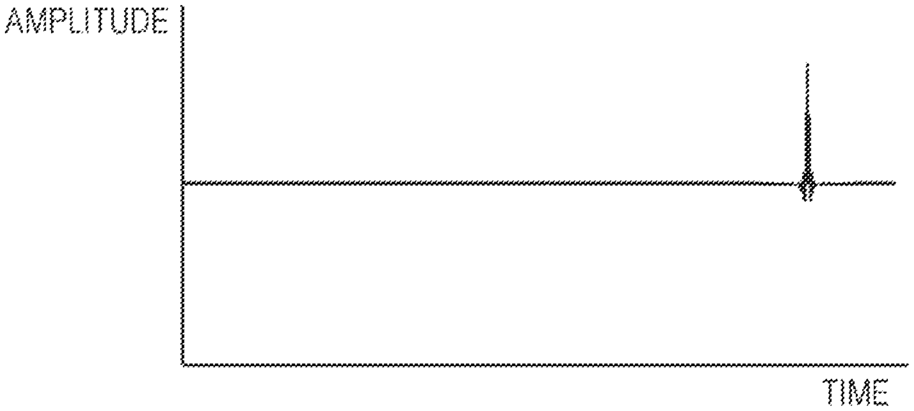
FIGS. 8A and 8B are diagrams illustrating an example of an impulse response in a case where a correction process is performed by a filter that realizes a reverse characteristic impulse response at the front position of the speaker, and an amplitude-frequency characteristic corresponding thereto.
Figure 8B:
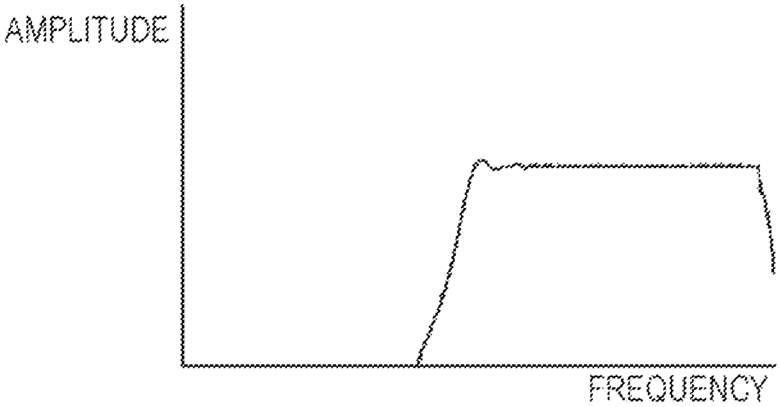

The audio signal processing unit 121 performs the correction process with respect to the audio signal SA by digital filter F in which the filter coefficient group h is set as described above. In this manner, the reverse characteristic is applied to the audio signal SA, and is overlapped with the speaker characteristic when this audio signal SA is emitted through the speaker 125. That is, the speaker characteristic of the speaker 125 is corrected. FIG. 8A illustrates the impulse response of the speaker 125 in a case where the audio signal SA is subjected to the correction process, and FIG. 8B illustrates the frequency characteristic thereof. As shown in FIGS. 8A and 8B, the peak of the impulse response becomes sharp and the frequency characteristic becomes flat.

That is, for example, in a case where an impulse response as shown in FIG. 6A and a frequency characteristic as shown in FIG. 6B are obtained by an impulse measurement at the front position of the speaker 25 as shown in FIG. 4, when a reverse characteristic thereof is calculated, results as shown in FIGS. 7A and 7B are obtained. In a case where an impulse response of a reverse characteristic thereof is realized by the digital filter F in the audio signal processing unit 121, when the speaker characteristic is measured at the same measurement point, it is possible to obtain a flat frequency characteristic as shown in FIG. 8A and an impulse response close to an impulse response shown in FIG. 8B.

As described above, the audio signal processing unit 122 performs the correction process by the filter that realizes the reverse characteristic of the impulse response measured at a location (listening position) different from the front position of the speaker 125. That is, the filter coefficient group h of the digital filter F making up the audio signal processing unit 122 is determined as described below.

Figure 9:
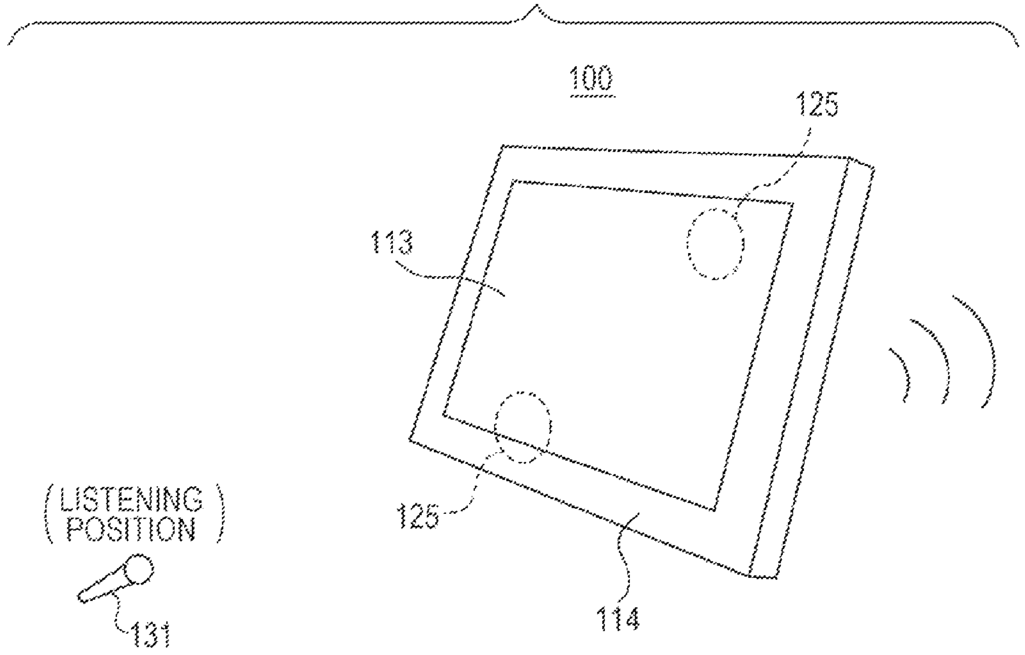
FIG. 9 is a diagram illustrating an impulse response measurement when a filter coefficient group is obtained in the audio signal processing unit to correct the speaker characteristic of the speaker in regard to a listening position.

The determination of the filter coefficient group h is performed based on a measurement result of the impulse response measured at a position (listening position) different from the front position of the speaker 125. As shown in FIG. 9, the measurement of the impulse response is performed by using the speaker 125 and the microphone 131 at the listening position. In this case, even when the speaker characteristic of the speaker 125 is corrected by the above-described audio signal processing unit 121, when a way in which a sound reaches the microphone 131 from the speaker 125 varies, the impulse response or frequency characteristic is disturbed due to an effect caused by diffraction or reflection of the sound.

Figure 10:
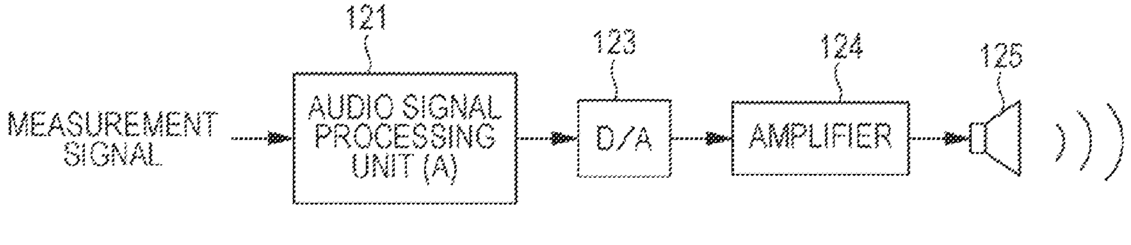
FIG. 10 is a diagram illustrating a configuration of the audio system when the filter coefficient group is obtained in the audio signal processing unit to correct the speaker characteristic of the speaker in regard to the listening position.

A measurement signal such as a TSP (Time Stretched Pulse) signal is supplied to the speaker 125, and is emitted from the speaker 125. This audio is measured by using the microphone 131, and an impulse response is obtained. FIG. 10 illustrates a configuration of an audio system of this case. In this case, the measurement signal is corrected in the audio signal processing unit 121, and is converted from a digital signal to an analog signal in the D/A converter 123, and is amplified in the amplifier 124, and then is supplied to the speaker 125.

Figure 11A:
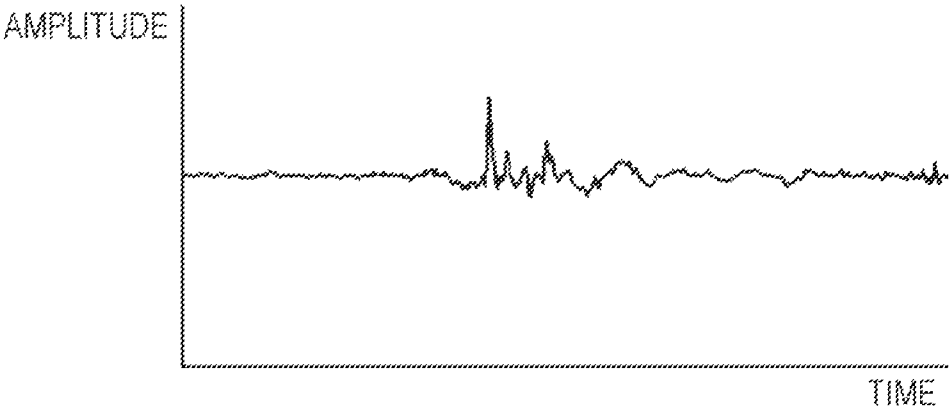
FIGS. 11A and 11B are diagrams illustrating an example of an impulse response measured at the listening position, and an amplitude-frequency characteristic corresponding thereto.
Figure 11B:
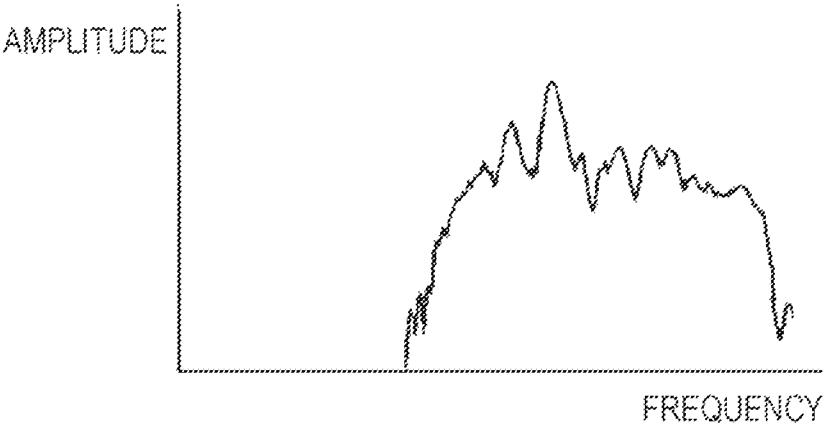

FIG. 11A illustrates an example of the impulse response measured by the microphone 131. In FIG. 11A, the horizontal axis represents time, and the vertical axis represents amplitude. The impulse response shown in FIG. 11A is subject to a Fourier transformation (time domain signal is transformed to a frequency domain signal), such that an amplitude-frequency characteristic as shown in FIG. 11B may be obtained. In FIG. 11B, the horizontal axis represents frequency and the vertical axis represents amplitude. The characteristic of the speaker 125 shown in FIGS. 11A and 11B is a speaker characteristic.

The filter coefficient group h of the digital filter F making up the audio signal processing unit 122 is determined in such a manner that the speaker characteristic of the speaker 125 shown in FIGS. 11A and 11B at a listening position is corrected into an ideal speaker characteristic at the listening position. The ideal speaker characteristic represents an impulse response that is to be collected by a microphone under the assumption that the ideal speaker and microphone are opposite to each other with the same distance as when the impulse response of the speaker 125 was measured at the listening position, and a frequency characteristic thereof. Here, as the ideal speaker characteristic, an example where an impulse peak is sharp and the frequency characteristic is flat is exemplified, but this is not limited thereto and may be arbitrarily set.

Figure 12A:
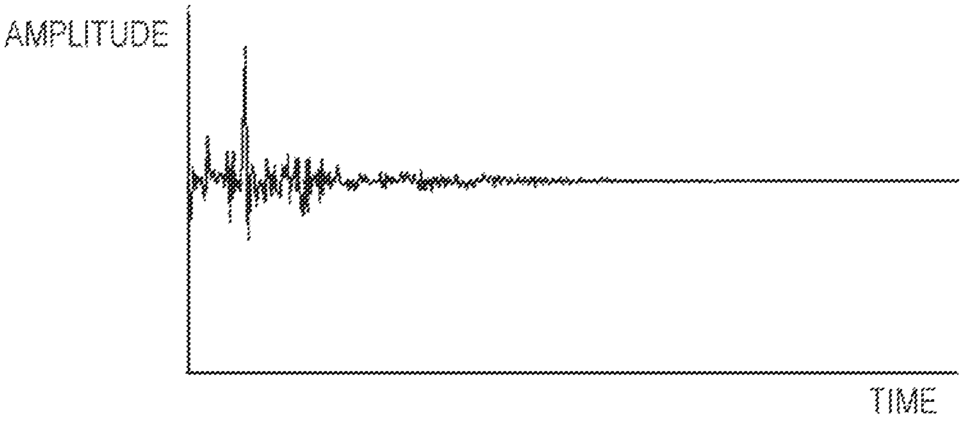
FIG. 12 is a diagram illustrating an example of a reverse characteristic impulse response of the impulse response measured at the listening position, and an amplitude-frequency characteristic corresponding thereto.
Figure 12B:
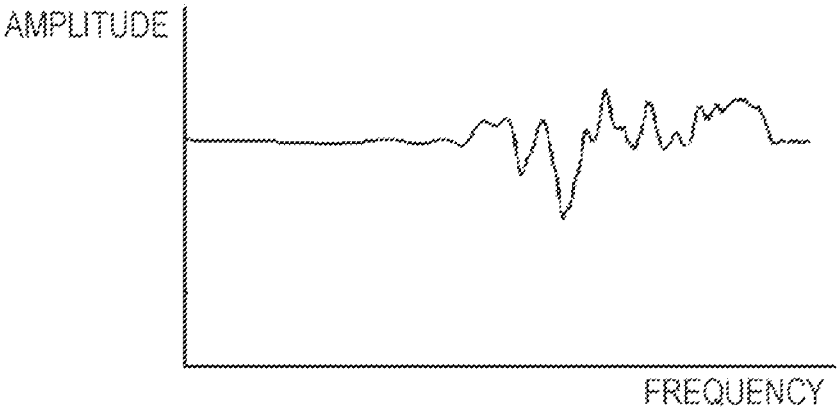

The filter coefficient group h (h0 to hN) of the digital filter F making up the audio signal processing unit 122 is regarded to realize the "reverse characteristic" that is calculated by excluding "1" in the speaker characteristic of the speaker 125. FIG. 12A illustrates an impulse response of the reverse characteristic and FIG. 12B illustrates a frequency characteristic of the reverse characteristic. This impulse response of the reverse characteristic may be set as the filter coefficients h0 to hN of the digital filter F. In addition, the number of the filter coefficients h0 to hN (the number of taps) is the number of peaks of the impulse response.

Figure 13A:
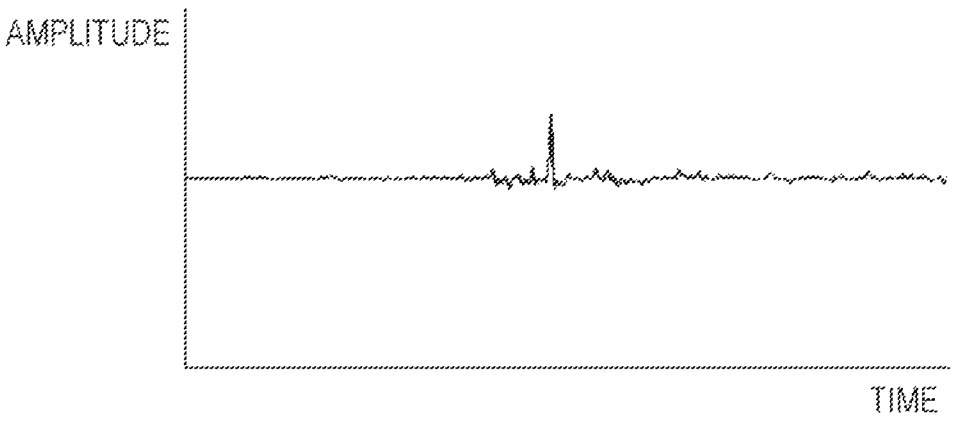
FIGS. 13A and 13B are diagrams illustrating an example of an impulse response in a case where a correction process is performed by a filter that realizes a reverse characteristic impulse response at the listening position, and an amplitude-frequency characteristic corresponding thereto.
Figure 13B:
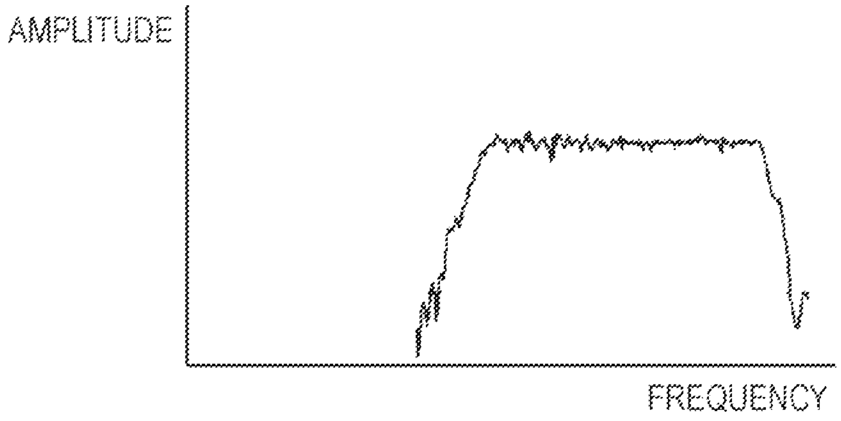

The audio signal processing unit 122 performs the correction process with respect to the audio signal SA by a digital filter F in which the filter coefficient group h is set as described above. In this manner, the reverse characteristic is applied to the audio signal SA, and is overlapped with the speaker characteristic when this audio signal SA is emitted through the speaker 125. That is, the speaker characteristic of the speaker 125 at the listening position is corrected. FIG. 13A illustrates the impulse response of the speaker 125 in a case where the audio signal is subjected to the correction process, and FIG. 13B illustrates the frequency characteristic thereof. As shown in FIGS. 13A and 13B, the peak of the impulse response becomes sharp and the frequency characteristic becomes flat.

That is, it is assumed that when the speaker inverse filtering process is performed by the audio signal processing unit 121, for example, in regard to an impulse measurement at a listening position (listening point) as shown in FIG. 9, an impulse response and a frequency characteristic as shown in FIGS. 11A and 11B are obtained. In this case, when a reverse characteristic thereof is calculated, results as shown in FIGS. 12A and 12B are obtained. In a case where an impulse response of a reverse characteristic thereof is realized by the digital filter F in the audio signal processing unit 122, when the speaker characteristic is measured at the same measurement point, it is possible to obtain a flat frequency characteristic as shown in FIG. 13A and an impulse response close to an impulse response shown in FIG. 13B.

An operation of the audio system in the video and audio output section 106 of the digital photo frame 100 shown in FIG. 1. When audio such as a BGM is output, an audio signal SA is supplied to the audio signal processing unit 121. In the audio signal processing unit 121, a correction process is performed the audio signal SA by a filter that realizes a reverse characteristic of an impulse response measured at the front position of the speaker 125. In this manner, the reverse characteristic is applied to the audio signal SA, and is overlapped with the speaker characteristic when this audio signal SA is emitted through the speaker 125. That is, the speaker characteristic of the speaker 125 is corrected.

The output audio signal of the audio signal processing unit 121 is supplied to the audio signal processing unit 122. In the audio signal processing unit 122, a correction process is performed with respect to the audio signal SA by a filter that realizes the reverse characteristic of the impulse response measured at a position (listening position) different from the front position of the speaker 125. In this manner, the reverse characteristic is applied to the audio signal SA, and is overlapped with the speaker characteristic when this audio signal is emitted through the speaker 125. That is, the speaker characteristic of the speaker 125 at the listening position is corrected.

An output audio signal of the audio signal processing unit 121 is supplied to the D/A converter 123 and is converted from a digital signal to an analog signal. The analog audio signal output from the D/A converter 123 is amplified in the amplifier 124, and then is supplied to the speaker 125. From the speaker 125, audio corresponding to the audio signal is output.

As described above, in regard to the digital photo frame 100 shown in FIG. 1, in the audio system of the video and audio output section 106, through the correction process of the audio signal processing unit 121, it is possible to correct disturbance in an inherent sound pressure-frequency characteristic or a phase characteristic which the speaker 125 has. In addition, in this audio system, through the correction process of the audio signal processing unit 122, it is possible to correct disturbance in a sound pressure-frequency characteristic or a phase characteristic, which are caused due to a fact that the listening position (listening point) becomes different from the front position of the speaker 125. Therefore, even when the speaker 125 is not disposed in the front direction, it is possible to realize high acoustic quality. That is, an excellent localization of sound and acoustic quality may be realized.

2. Second Embodiment

Configuration Example of Digital Photo Frame

Figure 14:
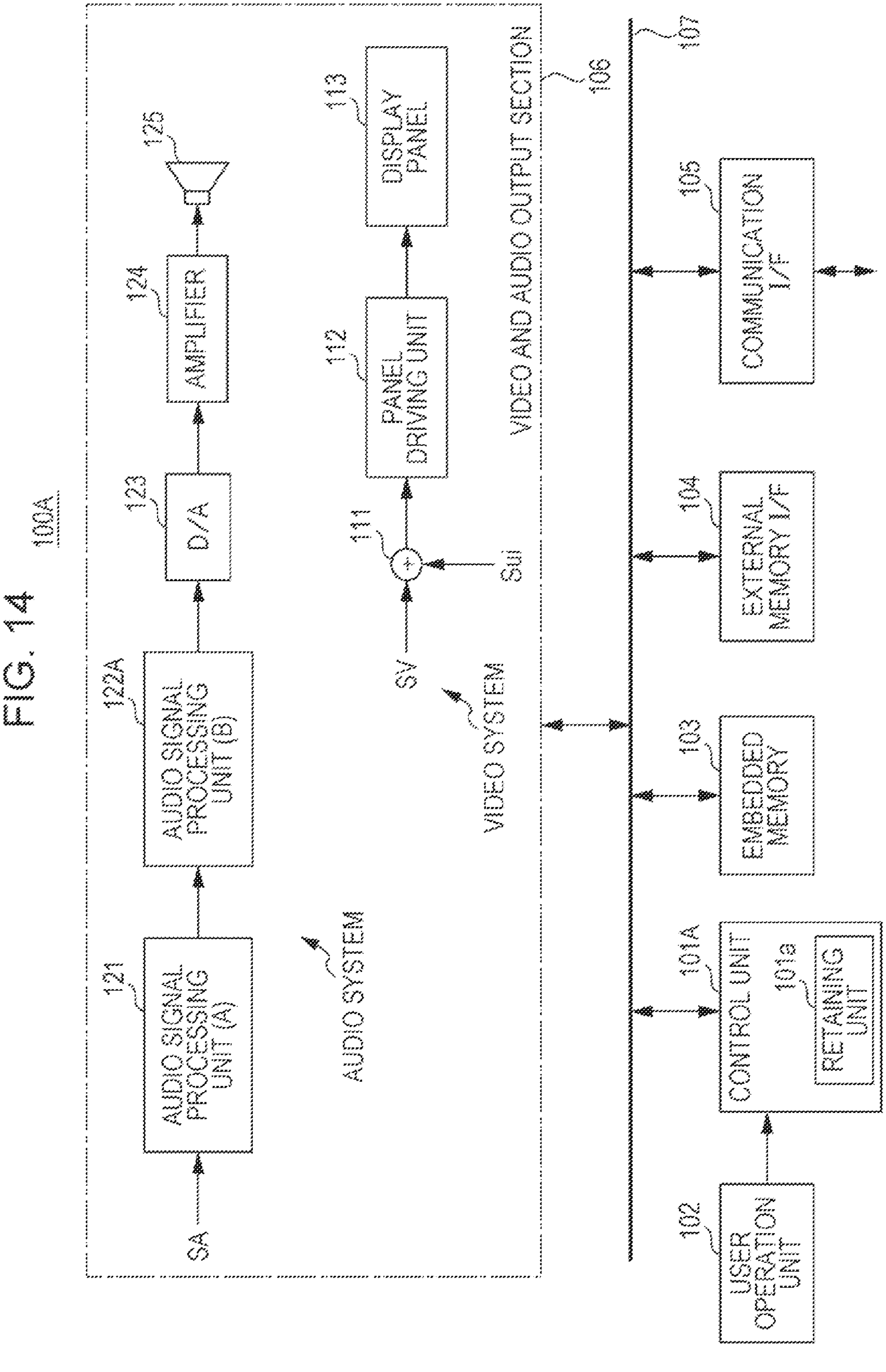
FIG. 14 is a block diagram illustrating a configuration example of a digital photo frame according to a second embodiment of the present disclosure.

FIG. 14 illustrates a configuration example of a digital photo frame 100A according to a second embodiment. In FIG. 14, like reference numerals will be given to like parts corresponding to FIG. 1, and detailed description thereof will not be repeated. This digital photo frame 100A includes a control unit 101A, a user operation unit 102, an embedded memory 103, an external memory interface 104, a communication interface 105, and a video and audio output section 106, and the respective units are connected to each other through an internal bus 107.

The video and audio output section 106 includes an overlapping unit 111, a panel driving unit 112, and a display panel 113 as a video system. In addition, the video and audio output section 106 includes an audio signal processing unit (audio signal processing unit (A)) 121, an audio signal processing unit (audio signal processing unit (B)) 122A, a D/A converter 123, an amplifier 124, and a speaker 125 as an audio system.

The audio signal processing unit 122A of the audio system of the video and audio output section 106 corresponds to the audio signal processing unit 122 of the audio system of the video and audio output section 106 in the digital photo frame 100 shown in FIG. 1. Similarly to the audio signal processing unit 122, the audio signal processing unit 122A performs a correction process with respect to an audio signal SA by a filter that realizes a reverse characteristic of an impulse response measured at a position (listening position) different from the front position of the speaker 125.

The filter coefficient group h set to the digital filter F of the audio signal processing unit 122 is fixed. Contrary to this, in the audio signal processing unit 122A, the setting of the filter coefficient group h of a digital filter F can be changed. This change in the setting of the filter coefficient group h of the digital filter F in the audio signal processing unit 122A is performed based on a selection operation of the filter coefficient group h by a user under the control of the control unit 101A. In this case, the control unit 101A makes up a filter coefficient group setting unit.

The control unit 101A corresponds to the control unit 101 of the digital photo frame 100 shown in FIG. 1, and includes a CPU, a ROM, a RAM, or the like and controls each unit of the digital photo frame 100A, similarly to the control unit 101. The control unit 101A includes a retaining unit 101*a*. This retaining unit 101*a* retains a plurality of filter coefficient groups h corresponding to an installation state of the digital photo frame 100A, that is an installation state of the speaker 125 as a filter coefficient group h that is set to the digital filter F of the audio signal processing unit 122A. The retaining unit 101*a* makes up a filter coefficient group retaining unit.

Figure 15:
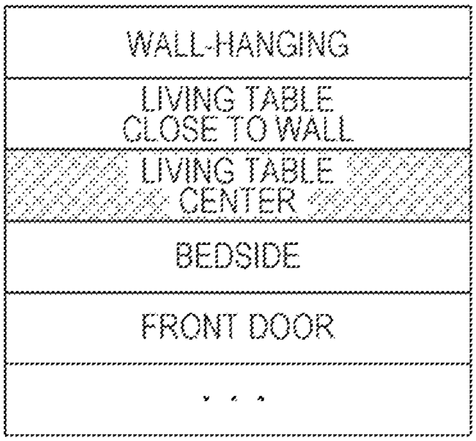
FIG. 15 is a diagram illustrating an example of an installation state (installation position) of the digital photo frame.

FIG. 15 illustrates an example of the installation state of the digital photo frame 100A. The retaining unit 101*h* retains the filter coefficient group h according to each installation state such as "wall-hanging", "living room table (close to wall)", "living room table (center)", "bed side", and "entrance hall". Disturbance in the sound pressure-frequency characteristic or the phase characteristic at the listening position varies depending on the installation state of the speaker. The filter coefficient group h related to each installation state is determined by performing an impulse measurement at the listening position, similarly to the filter coefficient group h of the digital filter F in the audio signal processing unit 122 shown in FIG. 1.

Figure 16:
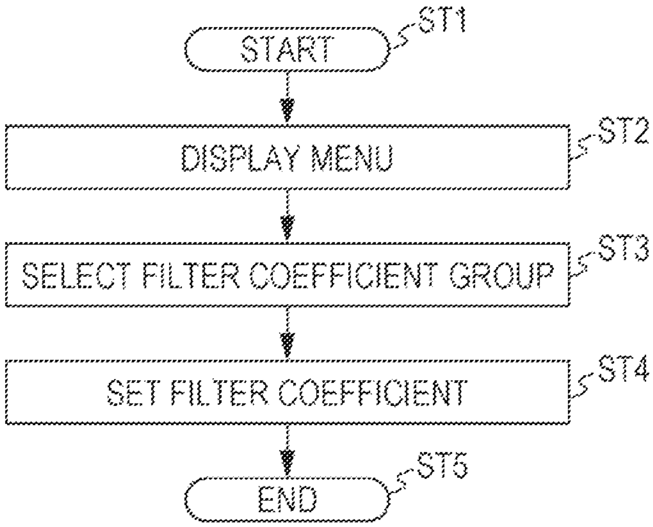
FIG. 16 is a flowchart illustrating an example of a process sequence of a filter coefficient setting in regard to a control unit.

A flowchart of FIG. 16 illustrates an example of a process sequence in the filter coefficient setting in the control unit 101A. In step ST1, the control unit 101A starts a process, and then moves to a process in step ST2. In step ST2, the control unit 101A displays a selection menu as shown in FIG. 15 on a display panel 113 for a selection operation of the filter coefficient group h by a user. In this case, the control unit 101A generates a display signal Sui of the selection menu. In addition, FIG. 15 illustrates a state where the filter coefficient group h of the "living room table (center) is selected."

Next, in step ST3, when a user selects a desired filter coefficient group h, in step ST4, the control unit 101A fetches the filter coefficient group h from the retaining unit 101*a*, and sets it to the digital filter F of the audio signal processing unit 122A. Then, in step ST5, the control unit 101A terminates the process.

Detailed description will not be repeated, but other configurations of the digital photo frame 100A shown in FIG. 14 are substantially the same as those of the digital photo frame 100 shown in FIG. 1 and operate in the same way.

As described above, in the digital photo frame 100A shown in FIG. 14, the disturbance in the sound pressure-frequency characteristic or the phase characteristic due to a difference in the listening position from the front position of the speaker 125 is corrected through the correction process in the audio signal processing unit 122A. Therefore, as is the case with the digital photo frame 100 shown in FIG. 1, even when the speaker 125 is not disposed in the front direction, it is possible to realize high acoustic quality.

In addition, in the digital photo frame 100A shown in FIG. 14, the setting of the filter coefficient group h of the digital filter F in the audio signal processing unit 122A can be changed. Therefore, the setting of the filter coefficient group h of the digital filter F in the audio signal processing unit 122A can be changed to a filter coefficient group h corresponding to the installation state of the digital photo frame 100A, that is, the installation state of the speaker 125. Therefore, it is possible to realize high acoustic quality regardless of the installation state of the digital photo frame 100A, that is, the installation of the speaker 125.

In addition, in regard to the digital photo frame 100A shown in FIG. 14, when the setting of the filter coefficient group h of the digital filter F in the audio signal processing unit 122A is changed, the selection menu is displayed on the display panel 113 (refer to FIG. 15). Therefore, a user may easily select the filter coefficient group h corresponding to the installation state of the digital photo frame 100A, that is, the installation state of the speaker 125.

3. Third Embodiment

Configuration Example of Digital Photo Frame

Figure 17:
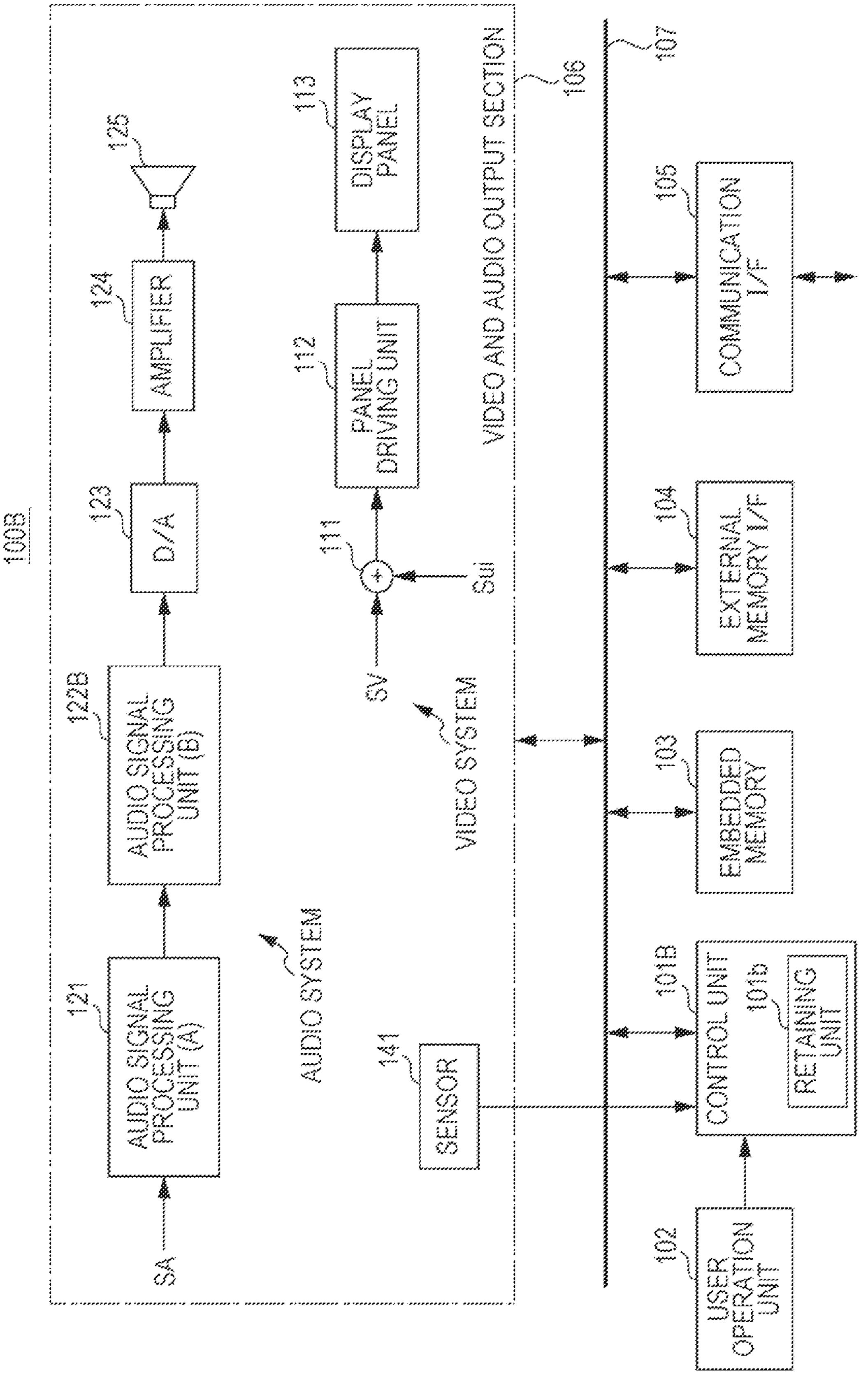
FIG. 17 is a block diagram illustrating a configuration example of a digital photo frame according to a third embodiment of the present disclosure.

FIG. 17 illustrates a configuration example of a digital photo frame 100B according to a third embodiment. In FIG. 17, like reference numerals will be given to like parts corresponding to FIG. 1, and detailed description thereof will not be repeated. This digital photo frame 100B includes a control unit 101B, a user operation unit 102, an embedded memory 103, an external memory interface 104, a communication interface 105, and a video and audio output section 106, and the respective units are connected to each other through an internal bus 107.

The video and audio output section 106 includes an overlapping unit 111, a panel driving unit 112, and a display panel 113 as a video system. In addition, the video and audio output section 106 includes an audio signal processing unit (audio signal processing unit (A)) 121, an audio signal processing unit (audio signal processing unit (B)) 122B, a D/A converter 123, an amplifier 124, and a speaker 125 as an audio system.

The audio signal processing unit 122B of the audio system of the video and audio output section 106 corresponds to the audio signal processing unit 122 of the audio system of the video and audio output section 106 in the digital photo frame 100 shown in FIG. 1. Similarly to the audio signal processing unit 122, the audio signal processing unit 122B performs a correction process with respect to an audio signal SA by a filter that realizes a reverse characteristic of an impulse response measured at a position (listening position) different from the front position of the speaker 125.

Figure 18A:
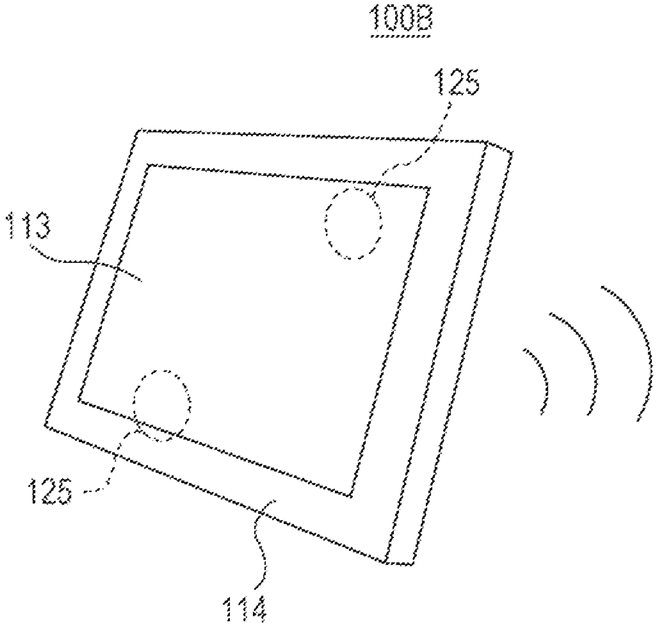
FIGS. 18A and 18B are diagrams illustrating a horizontal displacement state and a vertical displacement state of the digital photo frame.
Figure 18B:
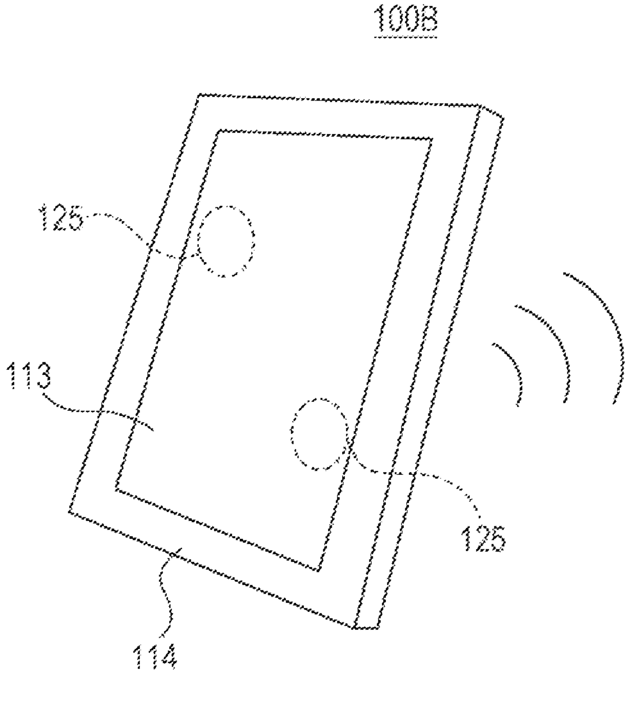

The filter coefficient group h set to the digital filter F of the audio signal processing unit 122 is fixed. Contrary to this, in the audio signal processing unit 122B, the setting of the filter coefficient group h of a digital filter F can be changed. This change in the setting of the filter coefficient group h of the digital filter F in the audio signal processing unit 122B is performed based on an installation angle of the digital photo frame 100B, that is, an installation angle of the display panel 113. More specifically, this setting is changed based on whether the digital photo frame 100B is disposed with a horizontal displacement or a vertical displacement under a control of the control unit 101B. In this case, the control unit 101B makes up a filter coefficient group setting unit. FIG. 18A illustrates a state where the digital photo frame 100B is disposed with the horizontal displacement, and FIG. 18B illustrates a state where the digital photo frame 100B is disposed with the vertical displacement.

The control unit 101B corresponds to the control unit 101 of the digital photo frame 100 shown in FIG. 1, and includes a CPU, a ROM, a RAM, or the like and controls each unit of the digital photo frame 100B, similarly to the control unit 101. The control unit 101B includes a retaining unit 101*b*. This retaining unit 101*b* retains a filter coefficient group h corresponding to the horizontal displacement and the vertical displacement of the digital photo frame 100B as a filter coefficient group h that is set to the digital filter F of the audio signal processing unit 122B. The retaining unit 101*b* makes up a filter coefficient group retaining unit.

A sensor 141 detects whether the digital photo frame 100B is disposed with the horizontal displacement or the vertical displacement, and this detection output is transmitted to the control unit 101B. The sensor 141 includes, for example, an angular velocity sensor such as a gyro sensor, a gravitational acceleration sensor, or a magnetic sensor. This sensor 141 makes up an installation angle detecting unit.

Disturbance in the sound pressure-frequency characteristic or phase characteristic in the listening position varies depending on the installation angle (the horizontal displacement and the vertical displacement) of the digital photo frame 100B, that is, the installation angle of the display panel 113. The filter coefficient group h corresponding to the horizontal displacement and the vertical displacement is determined by performing an impulse measurement at the listening position with respect to each installation angle, similarly to the filter coefficient group h of the digital filter F in the audio signal processing unit 122 shown in FIG. 1.

Figure 19:
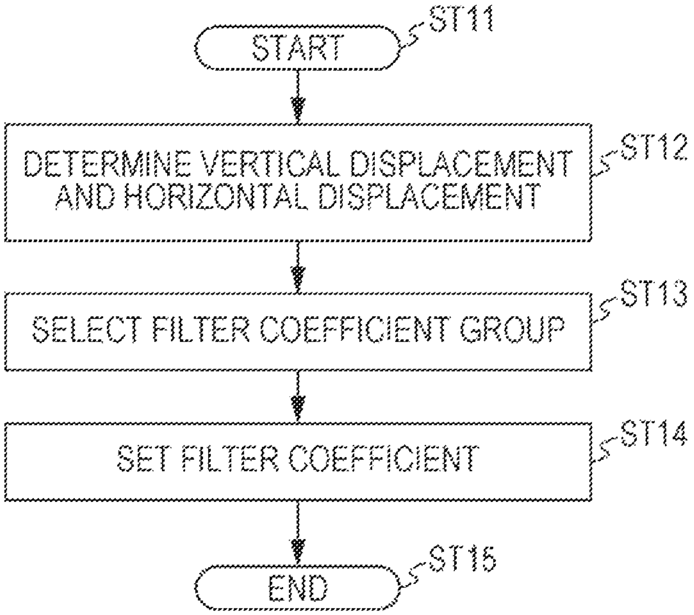
FIG. 19 is a flowchart illustrating an example of a process sequence of a filter coefficient setting in regard to a control unit.

A flowchart of FIG. 19 illustrates an example of a process sequence in the filter coefficient setting in the control unit 101B. In step ST11, the control unit 101B starts a process, and then moves to a process in step ST12. In step ST12, the control unit 101B determines whether the digital photo frame 100B is with the horizontal displacement or the vertical displacement based on a detection output of the sensor 141.

Next, in step ST13, the control unit 101B selects the filter coefficient group h of either the horizontal displacement or the vertical displacement based on the determination in step ST12. Then, in step ST14, the control unit 101B selectively fetches the filter coefficient group h selected in step ST13 from the retaining unit 101, and sets it to the digital filter F of the audio signal processing unit 122B. Then, in step ST15, the control unit 101B terminates the process.

Detailed description will not be repeated, but other configurations of the digital photo frame 100B shown in FIG. 17 are substantially the same as those of the digital photo frame 100 shown in FIG. 1 and operate in the same way.

As described above, in the digital photo frame 100B shown in FIG. 17, the disturbance in the sound pressure-frequency characteristic or the phase characteristic due to a difference in the listening position from the front position of the speaker 125 is corrected through the correction process in the audio signal processing unit 122B, similarly to the digital photo frame 100 shown in FIG. 1. Therefore, as is the case with the digital photo frame 100 shown in FIG. 1, even when the speaker 125 is not disposed in the front direction, it is possible to realize high acoustic quality.

In addition, in the digital photo frame 100B shown in FIG. 17, the setting of the filter coefficient group h of the digital filter F in the audio signal processing unit 122B can be changed. The filter coefficient group h of the digital filter F in the audio signal processing unit 122B is changed to a filter coefficient group h corresponding to the installation angle (the horizontal displacement or the vertical displacement) of the digital photo frame 100B based on the detection output of the sensor 141. Therefore, it is possible to realize high acoustic quality regardless of whether the digital photo frame 100B, that is, the display panel 113 is displace with the vertical displacement or the horizontal displacement.

4. Fourth Embodiment

Configuration Example of Television Receiver

Figure 20:
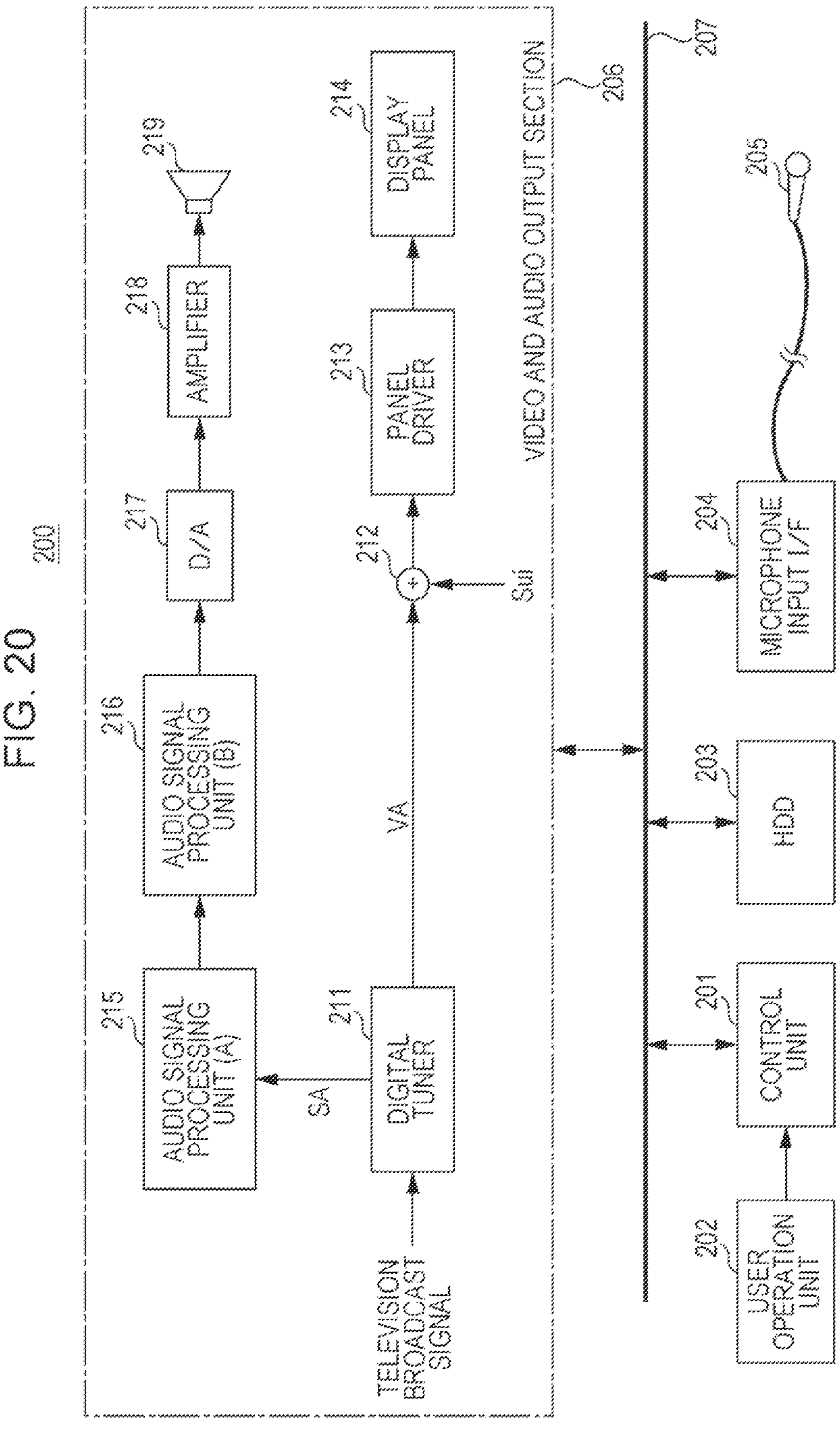
FIG. 20 is a block diagram illustrating a configuration example of a television receiver according to a fourth embodiment of the present disclosure.

FIG. 20 illustrates a configuration example of a television receiver 200 according to a fourth embodiment. The television receiver 200 includes a control unit 201, a user operation unit 202, an HDD (Hard Disk Drive) 203, a microphone input interface 204, a microphone 205, and a video and audio output section 206, and the respective units are connected to each other through an internal bus 207.

The control unit 201 controls each unit of the television receiver 200. The control unit 201 includes a CPU, a ROM, a RAM, or the like. The ROM stores a control program of the CPU, or the like. The RAM is used for temporary storage of data necessary for a control process of the CPU. The CPU develops the program or data read-out from the ROM on the RAM and activates the program, and controls each unit of the television receiver 200.

The user operation unit 202 makes up a user interface, and is connected to the control unit 201. The user operation unit 202 includes, for example, keys, buttons, a dial, or the like, which is disposed in a housing plane (not shown) of the television receiver 200, a transmitting and receiving device of a remote controller, a touch panel disposed on a display panel, or the like. A user may perform a power on and off operation of the television receiver 200, a channel selecting operation, or the like by using the user operation unit 202.

The HDD 203 performs a recording and a reproduction of a video signal. The microphone input interface 204 performs an input of an audio signal collected in the microphone 205. In addition, as a connection type between the microphone interface 204 and the microphone 205, a wireless connection may be considered, in addition to a wired connection through a cable as shown in the drawing.

The video and audio output section 206 will be described. The video and audio output section 206 includes a digital tuner 211, an overlapping unit 212, a panel driving unit 213, and a display panel 214. In addition, the video and audio output section 206 includes an audio signal processing unit (audio signal processing unit (A)) 215, an audio signal processing unit (audio signal processing unit (B)) 216, a D/A converter 217, an amplifier 218, and a speaker 219.

The digital tuner 211 processes a television broadcasting signal received by a reception antenna (not shown), and outputs a video signal SV and an audio signal SA corresponding to a user's channel selection. The panel driving unit 213 generates a panel driving signal that is necessary for displaying a video on the display panel 214 from the video signal SV supplied through the overlapping unit 212. The panel driving signal generated in the panel driving unit 213 is transmitted to the display panel 214, and the display panel 214 operates correspondingly to the panel driving signal, and thereby the received video is displayed on the display panel 214.

The display panel 214 displays the video based on the panel driving signal transmitted from the panel driving unit 213. The display panel 214 includes, for example, an LCD (Liquid Crystal Display), a PDP (Plasma Display Panel), or an organic El (electro-luminescence) panel, or the like.

The overlapping unit 212 overlaps a display signal Sui for a GUI (Graphical User Interface) screen generated under a control of the control unit 201 on a video signal SV, and supplies the resultant overlapped signal to the panel driving unit 213. In this manner, the display signal Sui is overlapped on the video signal SV, such that a user interface screen such as a menu display and a program table is displayed on the display panel 214 while being overlapped on a video.

Figure 21:
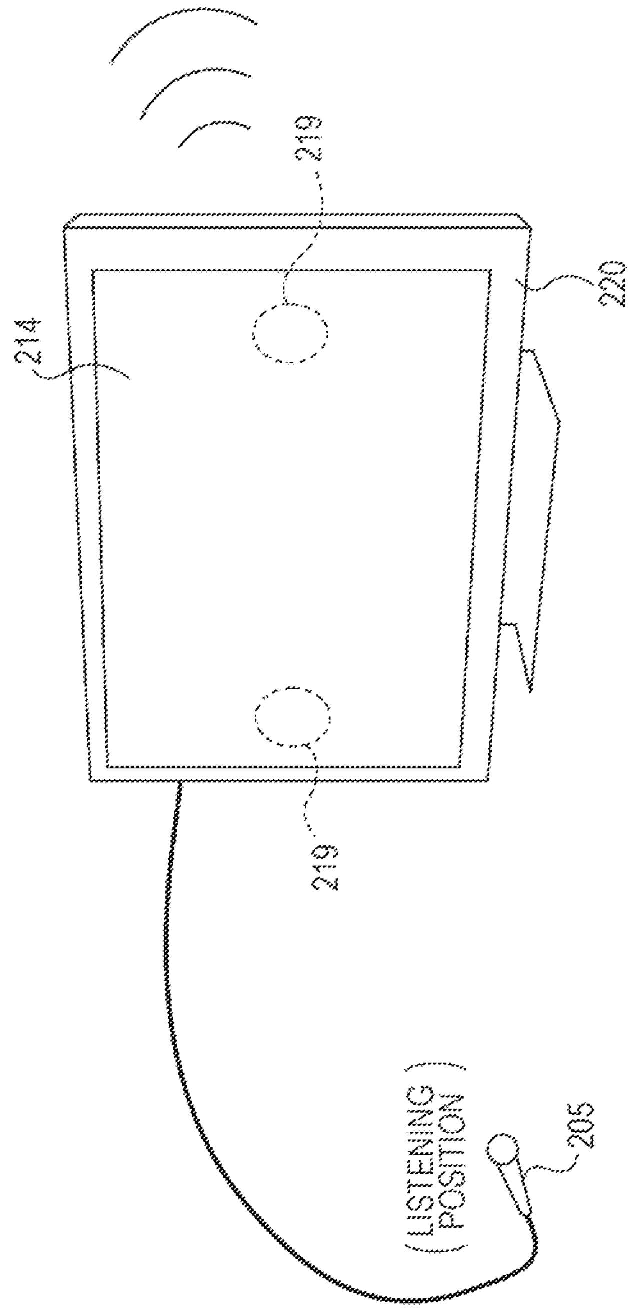
FIG. 21 is a diagram illustrating an exterior appearance of the television receiver and an impulse response measurement when a filter coefficient group is obtained in an audio signal processing unit to correct a speaker characteristic of a speaker in regard to a listening position.

FIG. 21 illustrates an exterior appearance of the television receiver 200. This television receiver 200 has an overall rectangular shape, and is configured in such a manner that the display panel 214 is inserted in a rectangular-shaped housing 220. A speaker 219 is provided in a rear surface as designated by a broken line. In addition, as the speaker 219, two speakers for left-side audio and right-side audio are provided to realize a stereo reproduction.

Returning to FIG. 1, next, an audio system of the video and audio output section 206 will be described. In addition, actually, two audio systems for left-side audio and right-side audio are provided, but two audio systems are the same as each other, such that, here, only one audio system will be described.

The audio signal processing unit 215 makes up one side audio signal processing unit, and the audio signal processing unit 216 makes up the other side audio signal processing unit. In this embodiment, the audio signal processing unit 215 is located at a front stage, the audio signal processing unit 216 is located at a subsequent state, and this order may be reversed. The audio signal processing units 215 and 216 serially perform a processing with respect to the audio signal (input audio signal) SA that can be obtained by the digital tuner 211, and obtain an output audio signal for driving the speaker 219.

The audio signal processing unit 215 corresponds to the audio signal processing unit 121 of the digital photo frame 100 shown in FIG. 1, and performs a correction process with respect to the audio signal SA, by a filter that realizes a reverse characteristic of an impulse response that is measured at a front position of the speaker 219. A filter coefficient group h of the digital filter F of the audio signal processing unit 215 is determined by performing an impulse measurement at the front position of the speaker 219 similarly to the filter coefficient group h of the digital filter F of the audio signal processing unit 122.

The audio signal processing unit 216 corresponds to the audio signal processing unit 122 of the digital photo frame 100 shown in FIG. 1. Similarly to the audio signal processing unit 122, the audio signal processing unit 216 performs a correction process with respect to the audio signal SA by a filter that realizes a reverse characteristic of the impulse response measured at a position (listening position) different from the front position of the speaker 125.

The filter coefficient group h set to the digital filter F of the audio signal processing unit 122 is fixed. Contrary to this, in the audio signal processing unit 216, the setting of the filter coefficient group h of a digital filter F can be changed. This setting of the filter coefficient group h is performed under the control of the control unit 201, but the details thereof will be described.

The D/A converter 217 converts the audio signal obtained in the audio signal processing unit 216 from a digital signal to an analog signal. In addition, the amplifier 218 amplifies the analog audio signal obtained in the D/A converter 217, and supplies the amplified signal to the speaker 219. The speaker 219 outputs audio corresponding to the audio signal supplied from the amplifier 218.

An operation of the television receiver 200 shown in FIG. 20 will be described. A television broadcasting signal received by a reception antenna (not shown) is supplied to the digital tuner 211. In this digital tuner 211, the television broadcasting signal is processed, and a video signal SV and an audio signal SA corresponding to a user's channel selection are output. The video signal SV output from the digital tuner 211 is supplied to the panel driving unit 213 through the overlapping unit 212.

In the panel driving unit 213, a panel driving signal that is necessary for displaying a video on the display panel 214 is generated from the video signal SV. This panel driving signal is transmitted to the display panel 214. In this manner, a received video is displayed on the display panel 214. In addition, a display signal Sui for a GUI screen is generated at an appropriate timing under a control of the control unit 201. This display signal Sui is supplied to the overlapping unit 212, and is overlapped on the video signal SV. In this manner, a user interface screen such as a menu display and a program table is displayed on the display panel 214 while being overlapped on a video.

In addition, the audio signal SA output from the digital tuner 211 is supplied to the audio signal processing unit 215. In this audio signal processing unit 215, a correction process is performed with respect to the audio signal SA by a filter that realizes a reverse characteristic of the impulse response measured at the front position of the speaker 219. In this manner, the reverse characteristic is applied to the audio signal SA, and is overlapped with the speaker characteristic when the audio signal SA is emitted through the speaker 219. That is, the speaker characteristic of the speaker 219 is corrected.

The output audio signal of the audio signal processing unit 215 is supplied to the audio signal processing unit 216. In the audio signal processing unit 216, a correction process is performed with respect to the audio signal SA by a filter that realizes the reverse characteristic of the impulse response measured at a position (listening position) different from the front position of the speaker 219. In this manner, the reverse characteristic is applied to audio signal SA and is overlapped with the speaker characteristic when this audio signal SA is emitted through the speaker 219. That is, the speaker characteristic of the speaker 219 at the listening position is corrected.

An output audio signal of the audio signal processing unit 216 is supplied to the D/A converter 217 and is converted from a digital signal to an analog signal. The analog audio signal output from the D/A converter 217 is amplified in the amplifier 218, and then is supplied to the speaker 219. From the speaker 219, a received audio, which corresponds to the received video that is displayed on the display panel 214, is output.

Figure 22:
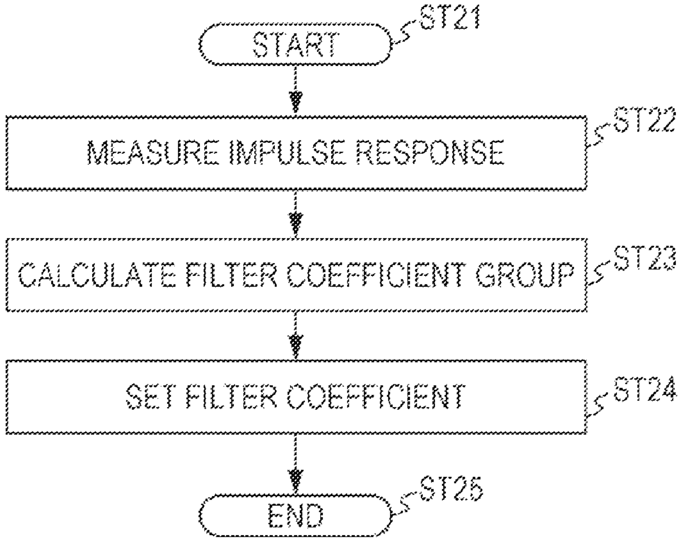
FIG. 22 is a flowchart illustrating an example of a process sequence of a filter coefficient setting in regard to a control unit.

Next, a setting process of filter coefficient group h in the digital filter F of the audio signal processing unit 216 will be described. The flowchart of FIG. 22 illustrates an example of a process sequence of the setting of the filter coefficient in the control unit 201. In step ST21, the control unit 201 starts a process, and then moves to a process in step ST22. In step ST22, the control unit 201 performs a measurement of the impulse response.

Figure 23:
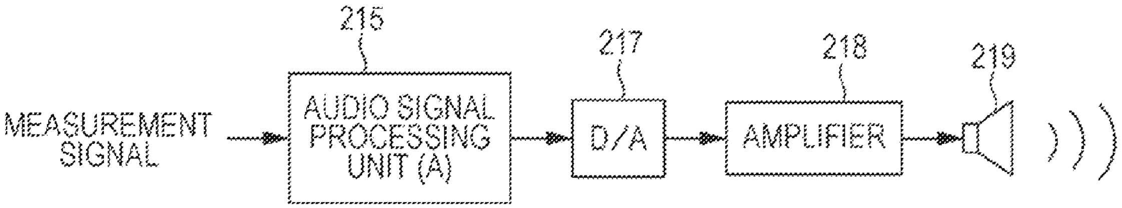
FIG. 23 is a diagram illustrating a configuration of an audio system when the filter coefficient group is obtained in the audio signal processing unit to correct the speaker characteristic of the speaker in regard to the listening position.

In this case, a configuration of audio system is set as a configuration shown in FIG. 23, and the control unit 201 supplies a measurement signal such as TSP (Time Stretched Pulse) signal to the speaker 219 and allows this signal to be emitted from the speaker 219. Then, this emitted audio is measured by the microphone 205, and an impulse response is obtained. In this case, as shown in FIG. 21, the microphone 205 is placed at the listening position, and in this regard, the microphone 205 makes up an impulse response measuring unit.

Next, in step ST23, the control unit 201 calculates the filter coefficient group h that is to be set to the digital filter F of the audio signal processing unit 216 based on the impulse response measured in step ST22. In this case, the control unit 201 calculates a reverse characteristic of the impulse response, and obtains the filter coefficient group h (filter coefficients h0 to hN) from this impulse response of the reverse characteristic. Then, in step ST24, the control unit 201 sets the filter coefficient group h calculated in step ST23 to the digital filter F of the audio signal processing unit 216. In this regard, the control unit 201 makes up a filter coefficient group calculating unit and a filter coefficient setting unit. Then, in step ST25, the control unit 201 terminates the process.

As described above, in regard to the television receiver 200 shown in FIG. 20, in the audio system of the video and audio output section 206, disturbance in an inherent sound pressure-frequency characteristic or a phase characteristic which the speaker 219 has is corrected through the correction process of the audio signal processing unit 215. In addition, in this audio system, through the correction process of the audio signal processing unit 216, it is possible to correct disturbance in a sound pressure-frequency characteristic or a phase characteristic, which are caused due to a fact that the listening position (listening point) becomes different from the front position of the speaker 219. Therefore, even when the speaker 219 is not disposed in the front direction, it is possible to provide high acoustic quality. That is, an excellent localization of sound and an acoustic quality may be realized.

In addition, in the television receiver 200 shown in FIG. 20, the setting of the filter coefficient group h of the digital filter F in the audio signal processing unit 216 can be changed. An impulse response at the listening position is measured by the microphone 205, a filter coefficient group h that realizes a reverse characteristic of the impulse response is calculated, and is set to the digital filter F of the audio signal processing unit 216. Therefore, disturbance in a sound pressure-frequency characteristic or a phase characteristic at the listening position can be reliably corrected. That is, as a filter coefficient group h of the digital filter F in the audio signal processing unit 216, one that is compatible with a use environment can be set and high acoustic quality can be realized regardless of an actual use environment of a user.

5. Modification

Modification 1

In addition, in the above-described second embodiment, the digital photo frame 100A is illustrated, and the plurality filter coefficient groups h that is retained in the retaining unit 101*a* corresponds to the installation state of the speaker such as "wall-hanging", "living room table (close to wall)", or the like. As the installation position state of the speaker, an installation angle state other than the installation position state may be included. Installation angle information includes, for example, a state such as a horizontal displacement and a vertical displacement.

Modification 2

In addition, the above-described second embodiment is applied to the digital photo frame 100A, but it may be considered that the same configuration is applied to, for example, an in-vehicle audio reproducing system (car audio system). That is, it may be considered that a plurality of filter coefficient groups h corresponding to an in-vehicle listening position is retained, and it is possible to arbitrarily change a filter coefficient group h of a digital filter in an audio signal processing unit that corrects a speaker characteristic of a speaker at the listening position.

Figure 24:
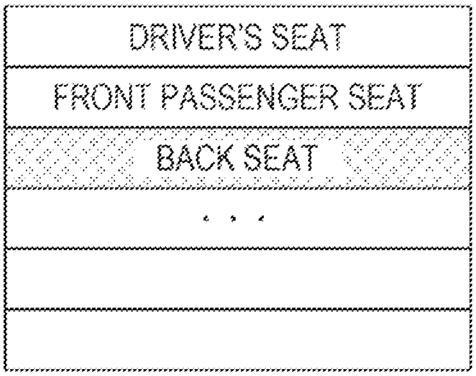
FIG. 24 is a diagram illustrating an example of a listening position inside a vehicle.

FIG. 24 illustrates an example of the listening position in the vehicle. In this case, a filter coefficient group retaining unit retains the filter coefficient group h corresponding to each listening position such as "driver's seat", "front passenger seat", and "back seat". Disturbance in a sound pressure-frequency characteristic or a phase characteristic at the listening position varies depending on the listening position. The filter coefficient group h at each listening position is determined by performing an impulse measurement regard to the listening position at each listening position, similarly to the filter coefficient group h of the digital filter F in the audio signal processing unit 122 described in FIG. 1.

Modification 3

In addition, the above-described third embodiment is applied to the digital photo frame 100B, but it may be considered that the same configuration is applied to, for example, a video camera. That is, it may be applied to a case where a speaker is integrally provided to a display panel portion of the video camera, and a plurality of aperture angles of the display panel with respect to a video camera main body is present. In this case, the aperture angle of the display panel is detected by a sensor, and as a filter coefficient group h of the digital filter in the audio signal processing unit that corrects a speaker characteristic of the speaker at a listening position, a filter coefficient group h corresponding to the aperture angle is automatically set.

Others

In addition, the above-described embodiments are illustrated to be applied to the digital photo frame or the television receiver. However, in addition to these apparatus, the embodiments of the present disclosure may be similarly applied to an apparatus (product) accompanied with another audio reproduction, for example, a video camera, a tablet PC, a mobile phone, a digital camera, a notebook PC, a portable gaming machine, a car audio, a dock type speaker, or the like.

In addition, in the above-described embodiments, the audio signal processing unit that corrects the speaker characteristic of the speaker, and the audio signal processing unit that corrects the speaker characteristic of the speaker at the listening position may be configured by software in addition to hardware. That is, it may be considered that these correction processes are performed by the software (program) using a computer.

The present disclosure contains subject matter related to that disclosed in Japanese Priority Patent Application JP 2010-244834 filed in the Japan Patent Office on Oct. 29, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An audio signal processing device comprising:

two audio signal processing units that serially perform a processing with respect to an input audio signal, and obtain an output audio signal for driving a speaker, wherein one audio signal processing unit of the two audio signal processing units performs, with respect to the input audio signal, a correction process through a filter that realizes a reverse characteristic of an impulse response measured at a first measurement position that is a front position of the speaker, and the other audio signal processing unit performs, with respect to the input audio signal, a correction process through a filter that realizes a reverse characteristic of an impulse response measured at a second measurement position different from the first measurement position that is a front position of the speaker.

2. The audio signal processing device according to claim 1, further comprising:

a filter coefficient group retaining unit that retains a plurality of filter coefficient groups as a filter coefficient group of the filter of the other audio signal processing unit;

a filter coefficient group selecting unit that selects an arbitrary filter coefficient group among the plurality of filter coefficient groups retained in the filter coefficient group retaining unit; and a filter coefficient setting unit that sets the filter coefficient group selected in the filter coefficient group selecting unit to the filter of the other audio signal processing unit.

3. The audio signal processing device according to claim 2, wherein the plurality of filter coefficient groups retained in the filter coefficient group retaining unit is a plurality of filter coefficient groups corresponding to an installation state of the speaker.

4. The audio signal processing device according to claim 2, wherein the plurality of filter coefficient groups retained in the filter coefficient group retaining unit is a plurality of filter coefficient groups corresponding to a listening position.

5. The audio signal processing device according to claim 1, wherein the speaker is disposed integrally with a display panel that performs a video display, and the audio signal processing device further comprises:

a filter coefficient group retaining unit that retains a plurality of filter coefficient groups corresponding to an installation angle of the display panel as the filter coefficient group of the other audio signal processing unit;

an installation angle detecting unit that detects the installation angle of the display panel; and a filter coefficient setting unit that fetches the filter coefficient group corresponding to the installation angle of the display panel from the plurality of filter coefficient groups that is retained in the filter coefficient group retaining unit, based on a detection output of the installation angle detecting unit, and sets the fetched filter coefficient group to the filter of the other audio signal processing unit.

6. The audio signal processing device according to claim 5, wherein as the installation angle of the display panel, there are two installation angles in a case where the display panel is disposed with a horizontal displacement and in a case where the display panel is disposed with a vertical displacement.

7. The audio signal processing device according to claim 1, further comprising:

an impulse response measuring unit that measures the impulse response at the second measurement position;

a filter coefficient group calculating unit that calculates the filter coefficient group of the filter that realizes a reverse characteristic of the impulse response measured in the impulse response measuring unit; and a filter coefficient setting unit that sets the filter coefficient group calculated in the filter coefficient group calculating unit to the filter of the other audio signal processing unit.

8. The audio signal processing device according to claim 1, wherein the one audio signal processing unit performs the correction process to correct disturbance at an inherent sound pressure-frequency characteristic or a phase characteristic of the speaker.

9. The audio signal processing device according to claim 8, wherein the other audio signal processing unit performs the correction process to correct disturbance in a sound pressure-frequency characteristic or a phase characteristic caused by variation between a listening position of a user and the front position of the speaker.

10. The audio signal processing device according to claim 1, wherein the other audio signal processing unit performs the correction process to correct disturbance in a sound pressure-frequency characteristic or a phase characteristic caused by variation between a listening position of a user and the front position of the speaker.

11. An audio signal processing method, comprising:

two audio signal processing steps of serially performing a processing with respect to an input audio signal and obtaining an output audio signal for driving a speaker, wherein in one audio signal processing step of the two audio signal processing steps, a correction process is performed with respect to the input audio signal through a filter that realizes a reverse characteristic of an impulse response measured at a first measurement position that is a front position of the speaker, and in the other audio signal processing step, a correction process is performed with respect to the input audio signal through a filter that realizes a reverse characteristic of an impulse response measured at a second measurement position different from the first measurement position that is a front position of the speaker.

12. A non-transitory computer-readable medium having embodied thereon a program, which when executed by a computer allows the computer to function as two audio signal processing units that serially perform a processing with respect to an input audio signal and obtain an output audio signal for driving a speaker, wherein one audio signal processing unit of the two audio signal processing units performs, with respect to the input audio signal, a correction process through a filter that realizes a reverse characteristic of an impulse response measured at a first measurement position that is a front position of the speaker, and the other audio signal processing unit performs, with respect to the input audio signal, a correction process through a filter that realizes a reverse characteristic of an impulse response measured at a second measurement position different from the first measurement position that is a front position of the speaker.

* * * * *